United States Patent
Damnjanovic et al.

(10) Patent No.: US 9,276,710 B2
(45) Date of Patent: Mar. 1, 2016

(54) METHOD AND APPARATUS FOR RESOURCE ALLOCATION WITH CARRIER EXTENSION

(75) Inventors: Jelena M. Damnjanovic, Del Mar, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 799 days.

(21) Appl. No.: 12/964,012

(22) Filed: Dec. 9, 2010

(65) Prior Publication Data

US 2012/0014330 A1 Jan. 19, 2012

Related U.S. Application Data

(60) Provisional application No. 61/288,800, filed on Dec. 21, 2009.

(51) Int. Cl.
*H04W 72/04* (2009.01)
*H04L 5/00* (2006.01)

(52) U.S. Cl.
CPC .............. *H04L 5/003* (2013.01); *H04L 5/001* (2013.01); *H04W 72/042* (2013.01); *H04W 72/0453* (2013.01)

(58) Field of Classification Search
CPC ........ H04W 72/04; H04L 5/001; H04L 5/003
USPC ......................................... 370/208, 254, 235
See application file for complete search history.

(56) References Cited

U.S. PATENT DOCUMENTS

| 7,991,004 | B2 * | 8/2011 | Nishio et al. .................. 370/468 |
| 8,031,583 | B2 * | 10/2011 | Classon et al. ................ 370/208 |
| 8,059,735 | B2 * | 11/2011 | Shen et al. ..................... 375/260 |

(Continued)

FOREIGN PATENT DOCUMENTS

| CN | 101223801 A | 7/2008 | |
| EP | 1838012 A1 * | 9/2007 | ................ H04L 1/00 |

(Continued)

OTHER PUBLICATIONS

International Search Report and Written Opinion—PCT/US2010/061649, International Search Authority—European Patent Office —Apr. 11, 2011.

(Continued)

*Primary Examiner* — Parth Patel

(57) ABSTRACT

Techniques for supporting communication with carrier extension are described. In one design, a base carrier and at least one segment available to a user equipment (UE) for communication may be determined. At least one operating parameter for the UE may be determined based on a composite bandwidth of the base carrier and the at least one segment. The UE may communicate based on the at least one operating parameter, which may include a resource block group (RBG) size and/or a bitmap used for resource allocation on the downlink, a gap used for resource allocation with frequency hopping on the downlink, a number of hopping bits used for resource allocation with frequency hopping on the uplink, a subband size and/or a number of bandwidth parts used for channel quality indicator (CQI) reporting, a sounding reference signal (SRS) bandwidth and/or a SRS configuration for SRS transmission on the uplink, and/or other operating parameters.

50 Claims, 8 Drawing Sheets

(56) References Cited

U.S. PATENT DOCUMENTS

| | | | |
|---|---|---|---|
| 8,493,835 B2* | 7/2013 | Gaal et al. | 370/208 |
| 8,542,605 B2 | 9/2013 | Chen et al. | |
| 8,559,938 B2* | 10/2013 | Sato et al. | 455/422.1 |
| 2002/0025818 A1* | 2/2002 | Kang et al. | 455/450 |
| 2003/0032429 A1* | 2/2003 | Macridis et al. | 455/435 |
| 2004/0203822 A1* | 10/2004 | Vitebsky | 455/452.1 |
| 2006/0007849 A1* | 1/2006 | Kim et al. | 370/208 |
| 2007/0026813 A1 | 2/2007 | Khan | |
| 2007/0058595 A1 | 3/2007 | Classon et al. | |
| 2007/0280166 A1* | 12/2007 | Jung et al. | 370/331 |
| 2008/0039098 A1 | 2/2008 | Papasakellariou et al. | |
| 2008/0130519 A1* | 6/2008 | Bahl et al. | 370/254 |
| 2008/0212556 A1 | 9/2008 | Heo et al. | |
| 2008/0253326 A1* | 10/2008 | Damnjanovic | 370/329 |
| 2008/0287068 A1* | 11/2008 | Etemad | 455/68 |
| 2009/0046647 A1* | 2/2009 | Roh et al. | 370/329 |
| 2009/0196180 A1* | 8/2009 | Bahl et al. | 370/235 |
| 2009/0257387 A1 | 10/2009 | Gholmieh et al. | |
| 2009/0268831 A1 | 10/2009 | Onggosanusi et al. | |
| 2009/0279480 A1* | 11/2009 | Rosenqvist et al. | 370/328 |
| 2009/0310476 A1 | 12/2009 | Seo et al. | |
| 2009/0325585 A1* | 12/2009 | Farajidana et al. | 455/450 |
| 2010/0067410 A1* | 3/2010 | He et al. | 370/280 |
| 2010/0074205 A1* | 3/2010 | Papasakellariou et al. | 370/329 |
| 2010/0120424 A1* | 5/2010 | Johansson et al. | 455/435.1 |
| 2010/0159939 A1 | 6/2010 | Jeong et al. | |
| 2010/0165931 A1* | 7/2010 | Nimbalker et al. | 370/329 |
| 2010/0254329 A1* | 10/2010 | Pan et al. | 370/329 |
| 2010/0281323 A1* | 11/2010 | Wang et al. | 714/748 |
| 2010/0291937 A1* | 11/2010 | Hu et al. | 455/450 |
| 2010/0312894 A1 | 12/2010 | Awad et al. | |
| 2011/0026495 A1* | 2/2011 | Lee et al. | 370/335 |
| 2011/0039568 A1* | 2/2011 | Zhang et al. | 455/452.1 |
| 2011/0069637 A1* | 3/2011 | Liu et al. | 370/254 |
| 2011/0081913 A1* | 4/2011 | Lee et al. | 455/450 |
| 2011/0085457 A1* | 4/2011 | Chen et al. | 370/252 |
| 2011/0085508 A1* | 4/2011 | Wengerter et al. | 370/329 |
| 2011/0086657 A1 | 4/2011 | Koivisto et al. | |
| 2011/0090854 A1 | 4/2011 | Montojo et al. | |
| 2011/0103292 A1* | 5/2011 | Pasad et al. | 370/315 |
| 2011/0151913 A1 | 6/2011 | Forster et al. | |
| 2011/0205995 A1 | 8/2011 | Groevlen | |
| 2011/0211538 A1* | 9/2011 | Kakura | 370/329 |
| 2012/0014330 A1* | 1/2012 | Damnjanovic et al. | 370/329 |
| 2012/0063413 A1* | 3/2012 | Kroener et al. | 370/330 |
| 2012/0087331 A1* | 4/2012 | Seo et al. | 370/329 |
| 2012/0093103 A1* | 4/2012 | Lee et al. | 370/329 |
| 2012/0106466 A1* | 5/2012 | Kuusela et al. | 370/329 |
| 2012/0106495 A1* | 5/2012 | Yang et al. | 370/329 |
| 2012/0122440 A1* | 5/2012 | Krishnamurthy et al. | 455/418 |
| 2012/0140726 A1* | 6/2012 | Moon et al. | 370/329 |
| 2012/0147794 A1* | 6/2012 | Chung et al. | 370/280 |
| 2012/0147846 A1* | 6/2012 | Ho et al. | 370/330 |
| 2013/0034062 A1* | 2/2013 | Seo et al. | 370/329 |

FOREIGN PATENT DOCUMENTS

| | | |
|---|---|---|
| EP | 2106057 A1 | 9/2009 |
| JP | 2006173809 A | 6/2006 |
| WO | WO-2008151228 A2 | 12/2008 |
| WO | WO-2009061257 A1 | 5/2009 |
| WO | WO-2010061717 A1 | 6/2010 |

OTHER PUBLICATIONS

Qualcomm Europe,"Notions of segment and backwards/non-backwards compatible carriers",3GPP TSG RAN WG1 #57bis, R1-092704,Jul. 2009,pp. 1-2, URL, http://www.3gpp.org/ftp/tsg_ran/wg1_rl1/TSGR1_57b/Docs/R1-092704.zip.

3GPP TS 36.211: "3rd Generation Partnership Project; Technical Specification Group Radio Access Network; Evolved Universal Terrestrial Radio Access (E-UTRA); Physical Channels and Modulation," Release 9, V9.0.0, Dec. 2009, pp. 1-85.

Taiwan Search Report—TW099145012—TIPO—Sep. 7, 2013.

Fujitsu: "Anchor component carrier and preferred control signal structure," 3GPP Draft; R1-091503, SRD Generation Partnership Project (3GPP), Mobile Competence Centre ; 650, Route Des Lucioles ; F-06921 Sophia-Antipolis Cedex ; France, no.Seoul, Korea; 20090318, Mar. 18, 2009, pp. 5, XP050339062.

Huawei: "Concept for downlink carrier aggregation in LTE-Advanced" 3GPP Draft; R1-083703, 3rd Generation Partnership Project (3GPP), Mobile Competence Centre ; 650, Route Des Lucioles ; F-06921 Sophia-Antipolis Cedex ; France, no. Prague, Czech Republic; 20080924, Sep. 24, 2008, XP050317045 [retrieved on Sep. 24, 2008].

Huawei: "PUCCH design for carrier aggregation" 3GPP Draft; R1-091275, 3rd Generation Partnership Project (3GPP), Mobile Competence Centre; 650, Route Des Lucioles ; F-06921 Sophia-Antipolis Cedex ; France, no. Seoul, Korea; 20090317, Mar. 17, 2009, 8 pages, XP050338883 [retrieved on Mar. 17, 2009].

Qualcomm Europe: "Multicarrier Control for LTE-Advanced" 3GPP Draft; R1-091460, 3rd Generation Partnership Project (SGPP), Mobile Competence Centre ; 650, Route Des Lucioles ; F-06921 Sophia-Antipolis Cedex ; France, no. Seoul, Korea; 20090318, Mar. 18, 2009, XP050339027.

Huawei: Component carrier structures, 3GPP TSG RAN WG1 Meeting #57 contribution, [online] 3GPP, R1-091809, pp. 1-3, (May 9, 2014), URL: http://www.3gpp.org/ftp/tsg_ran/WG1_RL1/TSGR1_57/Docs/R1-091809.zip.

Qualcomm Europe, "Notion of Anchor Carrier in LTE-A", 3GPP TSG RAN WG1 #56bis R1-091458, Mar. 23, 2009, pp. 1-5.

Qualcomm Europe: "Support of Rel-8 UEs by LTE-A Relays", 3GPP RAN WG1#54bis, R1-084054, Oct. 3, 2008.

* cited by examiner

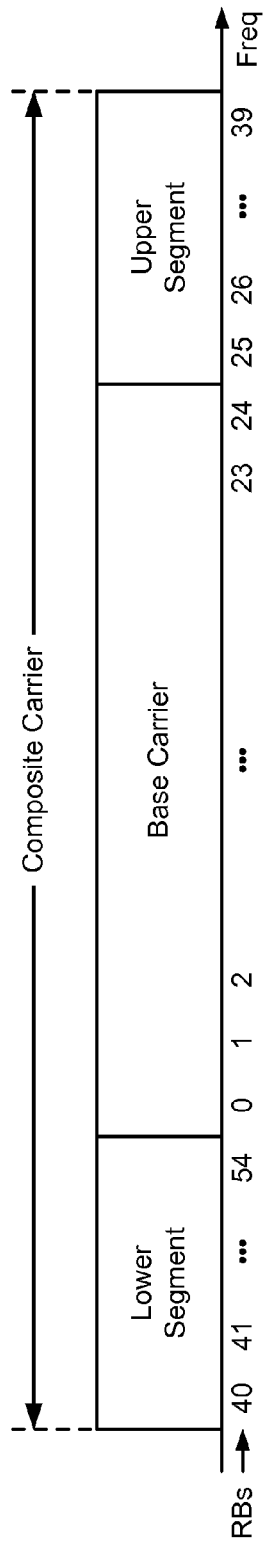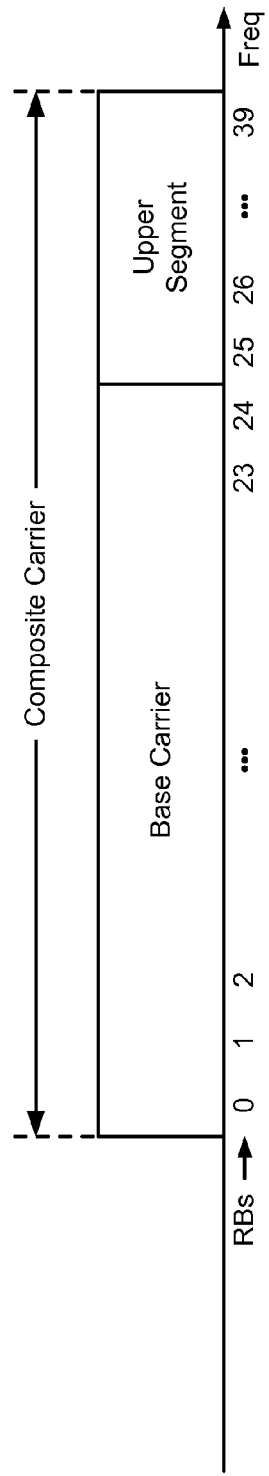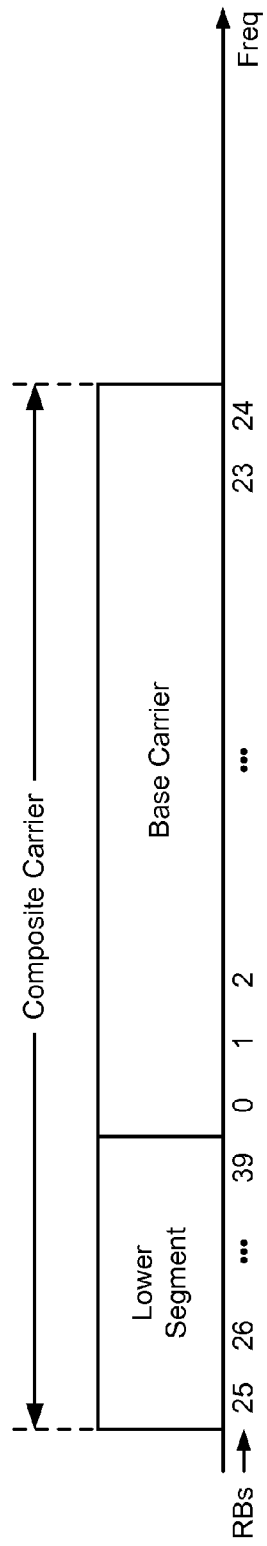
FIG. 4A
FIG. 4B
FIG. 4C

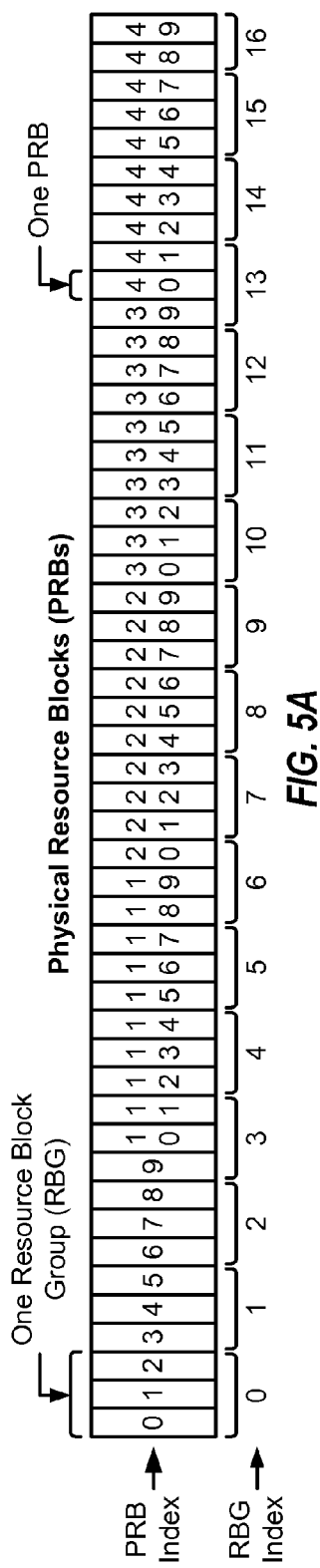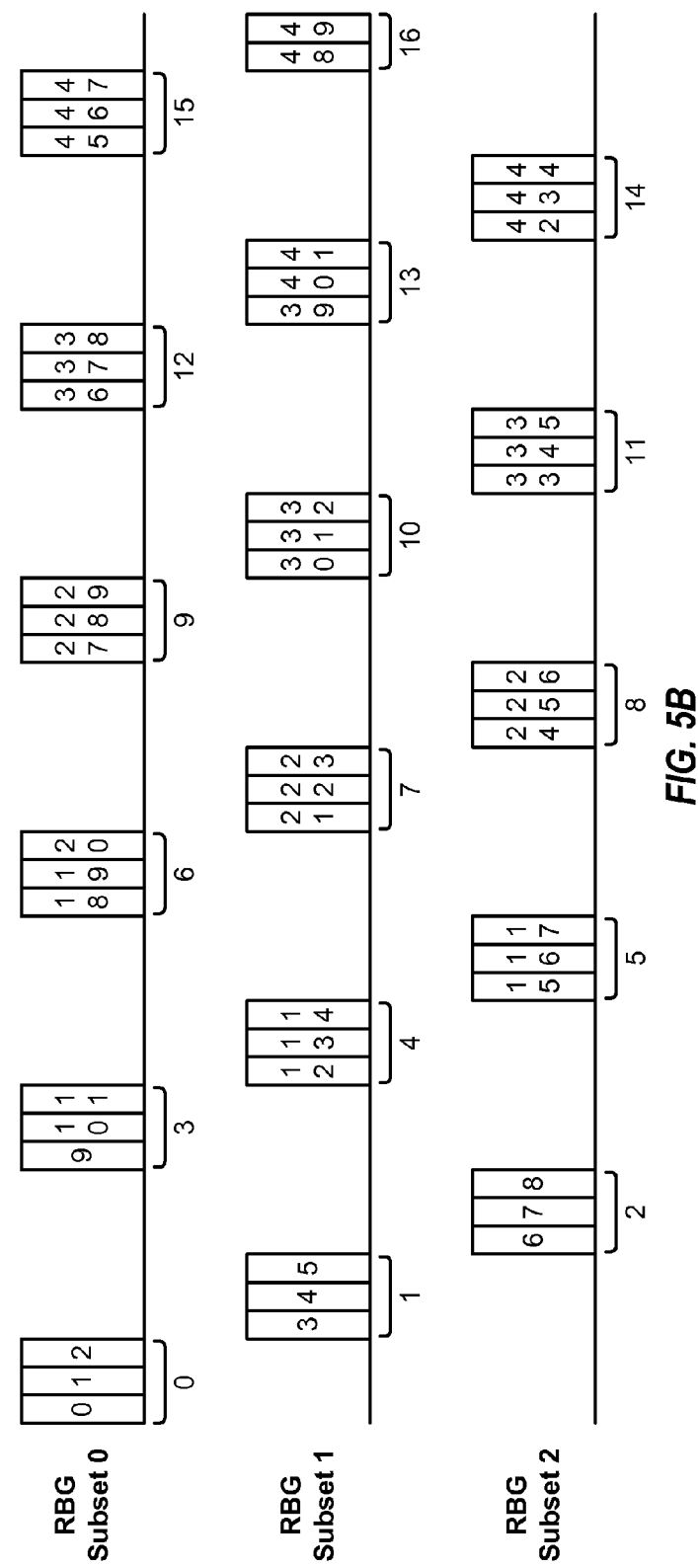
FIG. 5A
FIG. 5B

METHOD AND APPARATUS FOR RESOURCE ALLOCATION WITH CARRIER EXTENSION

The present application claims priority to provisional U.S. Application Ser. No. 61/288,800, entitled "SYSTEMS, APPARATUS AND METHODS FOR RESOURCE MANAGEMENT," filed Dec. 21, 2009, assigned to the assignee hereof and incorporated herein by reference.

BACKGROUND

I. Field

The present disclosure relates generally to communications, and more particularly to techniques for supporting communication in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Techniques for supporting communication with carrier extension are described herein. For carrier extension, a base carrier may be associated with one or more segments that provide an additional bandwidth. The combination of the base carrier and the one or more segments may be referred to as a composite carrier. Some UEs ("regular UEs") may operate on the base carrier only. Other UEs ("advanced UEs") may operate on the composite carrier and benefit from additional bandwidth provided by the one or more segments. Various operating parameters for communicating with UEs may be determined based on system bandwidth, which may be different for the regular UEs and the advanced UEs.

In one design that supports communication with an advanced UE using carrier extension, a base carrier and at least one segment available to the advanced UE for communication may be determined. At least one operating parameter for the advanced UE may be determined based on a composite bandwidth comprising the base carrier and the at least one segment. The advanced UE may communicate based on the at least one operating parameter, which may comprise (i) a resource block group (RBG) size used for resource allocation on the downlink, (ii) a bitmap used for resource allocation on the downlink, (iii) a gap used for resource allocation with frequency hopping on the downlink, (iv) a number of hopping bits used for resource allocation with frequency hopping on the uplink, (v) a subband size used for channel quality indicator (CQI) reporting, (vi) a number of bandwidth parts used for CQI reporting, (vii) a sounding reference signal (SRS) bandwidth for SRS transmission on the uplink, (viii) a SRS configuration for SRS transmission, and/or (ix) other operating parameters.

In one design of supporting communication for the regular UEs and advanced UEs, a base carrier and at least one segment available for communication may be determined. A first operating parameter for a regular UE may be determined based on a base bandwidth of the base carrier. A second operating parameter for an advanced UE may be determined based on a composite bandwidth of the base carrier and the at least one segment. Communication with the regular UE may be performed based on the first operating parameter. Communication with the second UE may be performed based on the second operating parameter.

Various aspects and features of the disclosure are described in further detail below.

BRIEF DESCRIPTION OF THE DRAWINGS

FIGS. 4A-4C show three designs of carrier extension.

FIG. 5A shows an exemplary partitioning of physical resource blocks (PRBs) into RBGs.

FIG. 5B shows an example of forming RBG subsets based on the RBGs.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
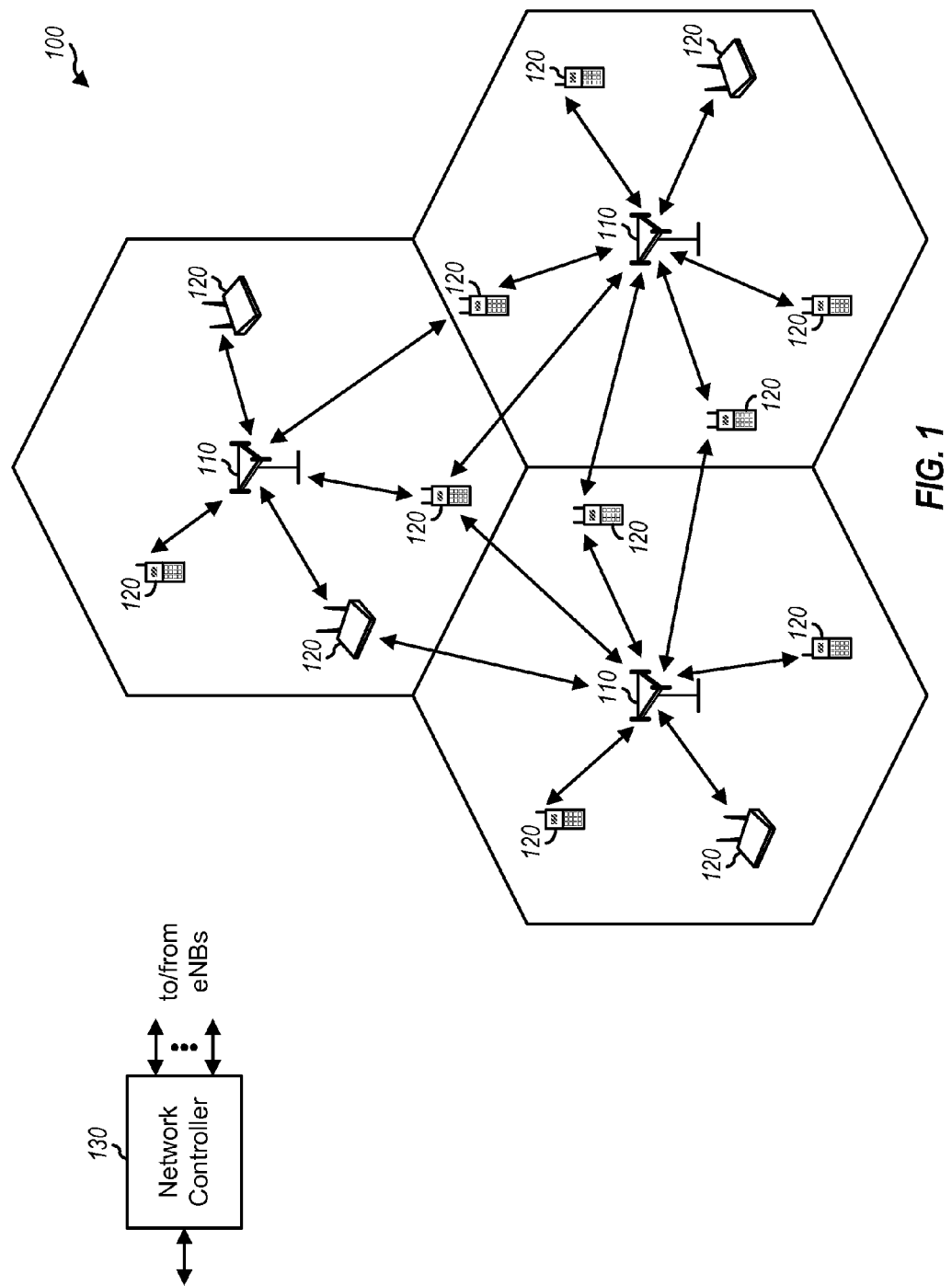
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

A network controller 130 may couple to a set of eNBs and may provide coordination and control for the eNBs. Network controller 130 may comprise a Mobility Management Entity (MME) and/or some other network entity.

UEs 120 may be dispersed throughout the system, and each UE may be stationary or mobile. A UE may also be referred to as a mobile station, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

System 100 may support hybrid automatic retransmission (HARQ) to improve the reliability of data transmission. For HARQ, a transmitter (e.g., an eNB) may send a transmission of a data packet (or a transport block) and may send one or more additional transmissions, if needed, until the packet is decoded correctly by a receiver (e.g., a UE), or the maximum number of transmissions has been sent for the packet, or some other termination condition is encountered. The transmitter may thus send a variable number of transmissions of the packet. For synchronous HARQ, all transmissions of the packet may be sent in subframes of a single HARQ interlace, which may include every Q-th subframes, where Q may be equal to 4, 6, 8, 10, or some other value. For asynchronous HARQ, each transmission of the packet may be sent in any subframe.

A number of HARQ processes may be supported for each of the downlink and uplink, and each HARQ process may cover all transmissions of a packet. A HARQ process may be started for a new packet whenever resources are available and may terminate when the packet is decoded correctly or a termination condition is encountered.

System 100 may utilize frequency division duplexing (FDD) or time division duplexing (TDD). For FDD, the downlink and uplink are allocated separate frequency channels. Downlink transmissions and uplink transmissions may be sent concurrently on the two frequency channels. For TDD, the downlink and uplink share the same frequency channel. Downlink and uplink transmissions may be sent on the same frequency channel in different time intervals.

Figure 2:
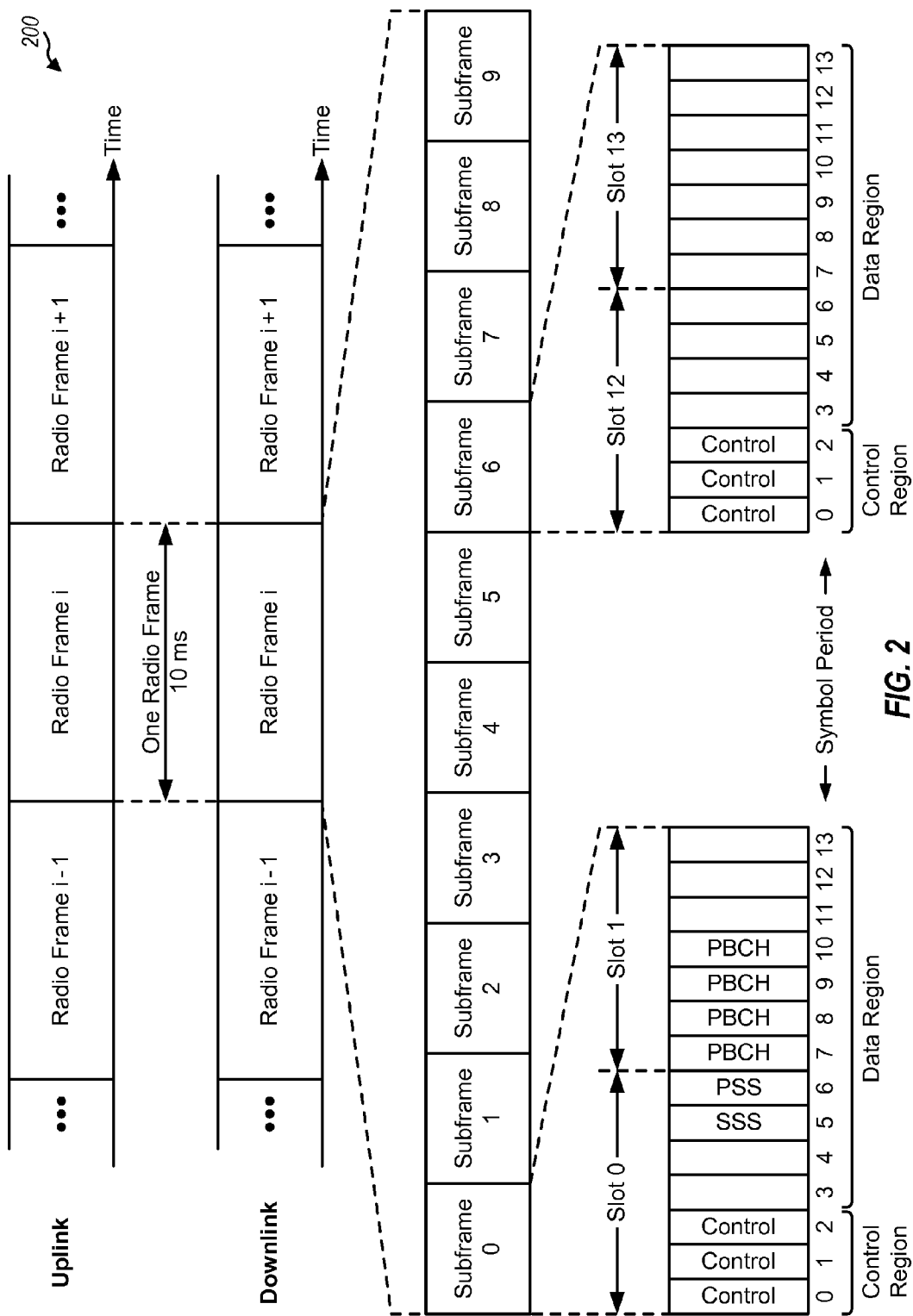
FIG. 2 shows an exemplary frame structure for the downlink.

FIG. 2 shows a frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

Each subframe for the downlink may include a control region and a data region, which may be time division multiplexed (TDM) as shown in FIG. 2. The control region may include the first M symbol periods of the subframe, where M may be equal to 1, 2, 3 or 4 and may change from subframe to subframe. The control region may carry control information for UEs. The data region may include the remaining symbol periods of the subframe and may carry data and/or other information for UEs.

An eNB may transmit a Physical Control Format Indicator Channel (PCFICH), a Physical HARQ Indicator Channel (PHICH), and a Physical Downlink Control Channel (PDCCH) in the control region of a subframe. The PCFICH may be transmitted in the first symbol period of the subframe and may convey the size of the control region (i.e., the value of M). The PHICH may carry acknowledgement (ACK) information for data transmission sent on the uplink with HARQ. The PDCCH may carry downlink control information (DCI) for UEs. The DCI may comprise downlink grants, uplink grants, power control information, etc. The eNB may transmit a Physical Downlink Shared Channel (PDSCH) in the data region of a subframe. The PDSCH may carry traffic data for UEs scheduled for data transmission on the downlink.

The eNB may transmit a primary synchronization signal (PSS) and a secondary synchronization signal (SSS) on the downlink in the center 1.08 MHz of the system bandwidth for each cell supported by the eNB. For FDD, the PSS and SSS may be transmitted in symbol periods 6 and 5, respectively, in subframes 0 and 5 of each radio frame with the normal cyclic prefix, as shown in FIG. 2. The PSS and SSS may be used by the UEs for cell search and acquisition. The eNB may also transmit a Physical Broadcast Channel (PBCH) carrying some system information in symbol periods 0 to 3 in slot 1 of certain radio frames, as shown in FIG. 2. The eNB may also transmit a cell-specific reference signal (CRS) across the system bandwidth in designated symbol periods of each subframe for each cell supported by the eNB. The CRS may be used by the UEs for channel measurement, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.25, 2.5, 5, 10 or 20 megahertz (MHz), respectively.

The available time frequency resources for each of the downlink and uplink may be partitioned into physical resource blocks (PRBs), which may also be referred to as resource blocks (RBs). Each RB may cover 12 subcarriers in one slot. The number of RBs in each slot may be dependent on the system bandwidth and may range from 6 to 110 for system bandwidth of 1.25 to 20 MHz, respectively. Each RB may include a number of resource elements. Each resource element may cover one subcarrier in one symbol period and may be used to transmit one modulation symbol, which may be a real or complex value.

Figure 3:
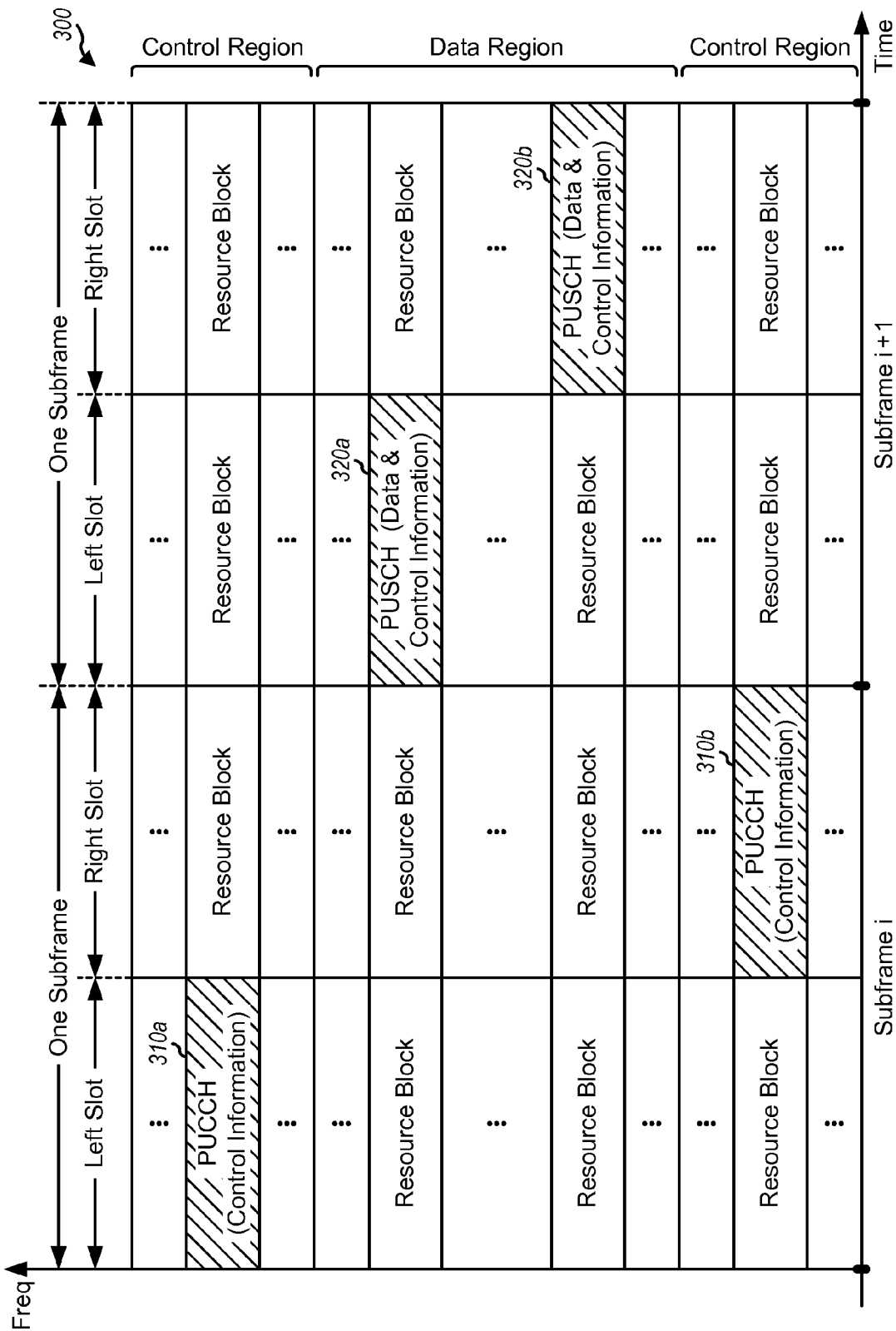
FIG. 3 shows an exemplary subframe structure for the uplink.

FIG. 3 shows a subframe structure 300 for the uplink in LTE. Each subframe for the uplink may include a control region and a data region, which may be frequency division multiplexed (FDM). The control region may be formed at the two edges of the system bandwidth and may have a configurable size, which may be selected based on the amount of control information being sent on the uplink by the UEs. The data region may include the remaining frequency not covered by the control region.

A UE may be assigned RBs 310a and 310b in the control region to send uplink control information (UCI) to an eNB. The UE may also be assigned RBs 320a and 320b in the data region to send data to the eNB. The UE may send UCI on a Physical Uplink Control Channel (PUCCH) on assigned RBs 310a and 310b in the control region. The UCI may include ACK information for data transmission sent on the downlink, CQI information, scheduling request, etc. The UE may send only data, or both data and UCI, on a Physical Uplink Shared Channel (PUSCH) on assigned RBs 320a and 320b in the data region. An uplink transmission may span both slots of a subframe and may hop across frequency, as shown in FIG. 3. The UE may transmit on a set of contiguous subcarriers in each symbol period in order to obtain a single-carrier waveform, which may have a lower peak-to-average power ratio (PAPR).

The various channels and signals in LTE are described in 3GPP TS 36.211, entitled "Evolved Universal Terrestrial Radio Access (E-UTRA); Physical Channels and Modulation," which is publicly available.

System 100 may additionally support operation on a single carrier or multiple carriers for each of the downlink and uplink. A carrier may refer to a range of frequencies used for communication and may be associated with certain characteristics. Operation on multiple carriers may also be referred to as carrier aggregation or multi-carrier operation. A UE may operate on one or more carriers for the downlink (or downlink carriers) and one or more carriers for the uplink (or uplink carriers) for communication with an eNB. The eNB may send data and control information on the one or more downlink carriers to the UE. The UE may send data and control information on the one or more uplink carriers to the eNB.

In one design of carrier aggregation, the downlink carriers may be paired with the uplink carriers. In this design, control information to support data transmission on a given downlink carrier may be sent on that downlink carrier and/or an associated uplink carrier. Similarly, control information to support data transmission on a given uplink carrier may be sent on that uplink carrier and/or an associated downlink carrier. In another design, cross-carrier control may be supported. In this design, control information to support data transmission on a given downlink carrier may be sent on another downlink carrier instead of the given downlink carrier.

In one design, for each of the downlink and uplink, one carrier may be referred to as an anchor carrier, and each remaining carrier may be referred to as an extension carrier. The anchor carrier may also be referred to as a primary carrier, a regular carrier, etc. The extension carriers may be contiguous or non-contiguous with the anchor carrier. A UE may be configured to operate on the anchor carrier and zero or more extension carriers for each of the downlink and uplink. The UE may have a carrier configuration that is specific for the UE and signaled via higher layer signaling. Each carrier may have one of a number of supported system bandwidths, which may correspond to 6, 15, 25, 50, 75 and 100 RBs.

In one design, control information to support data transmission on each carrier may be sent separately. For example, a first grant may be sent to support data transmission on the anchor carrier for the downlink or uplink, and a second grant may be sent to support data transmission on an extension carrier for the downlink or uplink. This design may enable each carrier to operate independently of the other carriers. For example, HARQ processes for each carrier may be independent of HARQ processes for other carriers. A transmission mode (e.g., for MIMO, etc.) may be selected separately for each carrier.

In one design, control information for all carriers may be sent on the anchor carrier. In the example above, the first and second grants may be sent on the downlink anchor carrier. This design may allow a downlink extension carrier to include only the data region and no control region, which may reduce overhead. In one design, an extension carrier may be configured without the CRS, PSS, SSS, broadcast channels, and paging channels. This design may also reduce overhead on the extension carrier. In this design, the extension carrier may not be backward compatible since UEs are unable to detect the PSS and SSS on the extension carrier and are also unable to receive the broadcast and paging channels and the CRS from the extension carrier.

The system may support carrier extension for a carrier on the downlink or uplink. For carrier extension, a base carrier may be associated with one or more segments, with each segment covering a range of frequencies and providing additional bandwidth for transmission. Carrier extension may be supported by certain UEs (which may be referred to as advanced UEs) and may not be supported by other UEs (which may be referred to as regular UEs).

FIG. 4A shows a design of carrier extension. In this design, a base carrier has a particular bandwidth, which may be referred to as a base bandwidth. A lower segment is located at a low end of the base carrier, and an upper segment is located at a high end of the base carrier. The combination of the base carrier and the lower and upper segments may be referred to as a composite carrier. The composite carrier has a particular bandwidth, which may be referred to as a composite bandwidth. In general, the bandwidth of the lower segment may or may not be equal to the bandwidth of the upper segment. In one design, for a system bandwidth of 20 MHz, the base bandwidth may include 100 RBs, and the composite bandwidth may include 110 RBs.

FIG. 4B shows another design of carrier extension. In this design, a single segment is located at the high end of a base carrier. The base carrier has a base bandwidth. A composite carrier is shown including the base carrier and the segment. The composite carrier has a composite bandwidth.

FIG. 4C shows yet another design of carrier extension. In this design, a single segment is located at the low end of a base carrier. The base carrier has a base bandwidth. A composite carrier includes the base carrier and the segment and has a composite bandwidth.

FIGS. 4A to 4C show three designs of carrier extension. In general, any number of segments may be supported for carrier extension, and each segment may have any bandwidth and may be located anywhere in relation to the base carrier. The segment(s) may be contiguous or non-contiguous with the base carrier and may be located on one side of both sides of the base carrier. The segment(s) may have a particular bandwidth, which may be referred to as a segment bandwidth. For clarity, much of the description below assumes the design shown in FIG. 4A.

Carrier extension may be supported for only the downlink, or only the uplink, or both the downlink and uplink. For carrier extension on the downlink, a downlink (DL) base carrier having a DL base bandwidth may be available to the regular UEs. A DL composite carrier comprising the DL base carrier and one or more segments and having a DL composite bandwidth may be available to the advanced UEs. For carrier extension on the uplink, an uplink (UL) base carrier having a UL base bandwidth may be available to the regular UEs. A UL composite carrier comprising the UL base carrier and one or more segments and having a UL composite bandwidth may be available to the advanced UEs. The DL base bandwidth may or may not match the UL base bandwidth, and the DL composite bandwidth may or may not match the UL composite bandwidth.

In general, for a given link (e.g., downlink or uplink), the base carrier may include any number of RBs, and each segment may include any number of RBs. The RBs within the base carrier may be available to the regular UEs and may be assigned indices from 0 to $N_{RB}-1$, where $N_{RB}$ is the number of RBs within the base carrier. The RBs within the base carrier and segment(s) may be available to the advanced UEs and may be assigned indices from 0 to $N_{RB,ADV}-1$, where $N_{RB,ADV}$ is the number of RBs within the composite carrier.

FIG. 4A shows a first design of numbering RBs for the advanced UEs. In this design, the numbering of RBs may start with the base carrier and extend to the segment(s). This design may result in the same numbering of the RBs within the base carrier for both the regular UEs and advanced UEs, which may avoid offsets between the RBs allocated to the regular UEs and the RBs allocated to the advanced UEs. In the example shown in FIG. 4A, the base carrier may include 25 RBs with indices of 0 to 24, the upper segment may include 15 RBs with indices of 25 to 39, and the lower segment may include 15 RBs with indices of 40 to 54.

FIG. 4B shows the first design of numbering RBs within a composite carrier including a base carrier and one upper segment. The base carrier may include 25 RBs with indices of 0 to 24, and the upper segment may include 15 RBs with indices of 25 to 39. FIG. 4C shows the first design of numbering RBs within a composite carrier including a base carrier and one lower segment. The base carrier may include 25 RBs with indices of 0 to 24, and the lower segment may include 15 RBs with indices of 25 to 39.

In another aspect, the numbering of RBs may start with a segment and extend to the base carrier. For example, in FIG. 4A, the lower segment may include 15 RBs with indices of 0 to 14, the base carrier may include 25 RBs with indices of 15 to 39, and the upper segment may include 15 RBs with indices of 40 to 54. RBs may also be numbered in other manners. For purposes of illustration, much of the description below assumes the first design of numbering RBs within the DL composite carrier and the UL composite carrier. However, this is not a requirement of the present disclosure.

In one design, carrier extension may be configured specifically for an advanced UE, e.g., via higher layers such as Radio Resource Control (RRC). A UE-specific configuration for carrier extension for a given link (e.g., downlink or uplink) may indicate the existence of one or more segments on that link, the bandwidth of each segment or all of the segments, linkage to a base carrier, etc. The UE-specific configuration may be conveyed to the UE, e.g., via higher layer signaling. In this design, different advanced UEs may have different carrier extension configurations. For example, a first advanced UE may be configured with the base carrier and the lower segment in FIG. 4A, a second advanced UE may be configured with the base carrier and the upper segment in FIG. 4A, and a third advanced UE may be configured with the base carrier and both segments in FIG. 4A. In another design, carrier extension may be configured for different classes of advanced UEs, e.g., via system information sent on a broadcast channel.

LTE Release 8 supports a standard set of system bandwidths, which correspond to 6, 15, 25, 50, 75 and 100 RBs. Carrier extension may be used to support up to 110 RBs for a composite carrier in a 20 MHz bandwidth. In one design, the bandwidth of each segment or all segments may be constrained to be equal to one of the set of system bandwidths supported in LTE Release 8 (e.g., may be equal to 6 or 15 RBs). In another design, the bandwidth of each segment or all segments may be set to any suitable value.

The combination of the base carrier and one or more associated segments may be regarded as a single carrier to the advanced UEs. Various features normally applicable to a single carrier may then apply to a composite carrier composed of the base carrier and associated segment(s). For example, a grant may allocate RBs within the composite carrier to an advanced UE. A single HARQ process may apply to the composite carrier. The same transmission mode may apply to the composite carrier. Other features may also be applicable for the composite carrier.

Certain transmissions for a given link may be sent on a base carrier but not the associated segment(s). For example, the CRS, PSS, SSS, broadcast channels, and paging channels may be sent on the DL base carrier but not the associated segment(s). A Physical Random Access Channel (PRACH) may be sent on the UL base carrier but not the associated segment(s). In another design, transmissions for a given link may be sent in the base carrier as well as the associated segment(s).

In one design, the base carrier for a given link may include the control region and the data region (e.g., as shown in FIG. 2 or 3), and the associated segment(s) may include only the data region but not the control region. In this design, the segment(s) may be considered as data extension to the base carrier. On the downlink, data may be sent on the segment(s) starting with the first OFDM symbol of a subframe. On the uplink, data may be sent on the segment(s) starting at the outer edges of the control region. In another design, the control region may span both the base carrier and segment(s).

In one design, control information for the base carrier and segment(s) of a given link (e.g., downlink or uplink) may be sent on the base carrier. For example, a downlink grant may be sent on the DL base carrier in the control region and may convey resources on the DL base carrier and/or segment(s).

Data may be sent on the composite carrier for a given link in similar manner as on the base carrier for that link. For example, data mapping, interleaving, and addressing for data sent on the composite carrier may follow the rules used for data sent on the base carrier. On the downlink, data may be sent on the PDSCH, which may avoid resources reserved for the CRS, PSS, SSS, and broadcast channels on the DL base carrier but not the segment(s).

Various operating parameters for data transmission on the downlink and uplink may be dependent on the system bandwidth for each link. The system bandwidth for a given link may correspond to (i) the base bandwidth for the base carrier for the regular UEs, or (ii) the composite bandwidth for the composite carrier for the advanced UEs. Various operating parameters for the advanced UEs may be determined as described below.

For the downlink, $N_{RB}^{DL}$ PRBs with indices of 0 to $N_{RB}^{DL}-1$ may be available within the DL base carrier in each slot. The number of PRBs in each slot may be dependent on the DL base bandwidth and may range from 6 to 110. Virtual resource blocks (VRBs) may also be defined to simplify allocation of resources. A VRB may have the same dimension as a PRB and may cover 12 subcarriers in one slot in a virtual domain. A VRB may be mapped to a PRB based on a VRB-to-PRB mapping. VRBs may be allocated to the UEs, and transmissions for the UEs may be sent on PRBs to which the allocated VRBs are mapped.

The available PRBs for the downlink may be partitioned into resource block groups (RBGs). Each RBG may include up to P consecutive PRBs, where P is the RBG size and is dependent on the DL system bandwidth. Table 1 lists the value of P for DL system bandwidth in LTE Release 8.

TABLE 1

RBG Size for DL System Bandwidth

| DL System Bandwidth ($N_{RB}^{DL}$) | RBG Size (P) |
|---|---|
| ≤10 | 1 |
| 11-26 | 2 |
| 27-63 | 3 |
| 63-110 | 4 |

$N_{RBG}$ RBGs may be defined with the $N_{RB}^{DL}$ available PRBs, where $N_{RBG}$ may be given as:

$$N_{RBG} = \lceil N_{RB}^{DL}/P \rceil, \qquad \text{Eq (1)}$$

where "⌈ ⌉" denotes a ceiling operator.

The $N_{RBG}$ RBGs may be divided into P RBG subsets with indices 0 to P−1. RBG subset p, for p=0, ..., P−1, may include every P-th RBG starting with RBG p. The P RBG subsets may or may not include the same number of RBGs, depending on whether ($N_{RBG}$ mod P)=0. The P RBG subsets may or may not include the same number of PRBs, depending on whether ($N_{RB}^{DL}$ mod P)=0.

FIG. 5A shows an example of partitioning PRBs into RBGs for the downlink. In this example, $N_{RB}^{DL}$=50, P=3 from Table 1, and $N_{RBG}$=17 from equation (1). The 50 PRBs with indices m=0 to 49 are partitioned into 17 RBGs with indices 0 to 16. PRB index m may also be referred to as $n_{PRB}$. Each of the first 16 RBGs includes P=3 contiguous PRBs, and the last RBG includes two remaining PRBs.

FIG. 5B shows an example of forming three RBG subsets with the 17 RBGs obtained with the 50 PRBs. RBG subset 0 includes six RBGs with indices 0, 3, 6, 9, 12 and 15 and includes 18 PRBs with indices m=0, 1, 2, 9, 10, 11, 18, 19, 20, etc. RBG subset 1 includes six RBGs with indices 1, 4, 7, 10, 13 and 16 and includes 17 PRBs with indices m=3, 4, 5, 12, 13, 14, 21, 22, 23, etc. RBG subset 2 includes five RBGs with indices 2, 5, 8, 11 and 14 and includes 15 PRBs with indices m=6, 7, 8, 15, 16, 17, 24, 25, 26, etc.

The system may support different resource allocation types for the downlink, which may include:

Resource allocation type 0—allocate an integer number of RBGs,

Resource allocation type 1—allocate PRBs within a select RBG subset, and

Resource allocation type 2—allocate localized or distributed VRBs.

For resource allocation type 0, a UE may be allocated any one of the $N_{RBG}$ RBGs. Resource allocation information for the UE may include a bitmap comprising $N_{RBG}$ bits, one bit for each available RBG. Each bit in the bitmap may be set to either '1' to indicate an allocated RBG or '0' to indicate an un-allocated RBG. Signaling overhead may be reduced by having one bit for each RBG (instead of one bit for each PRB). However, resources are allocated in coarse units of RBG (instead of in fine units of PRB).

For resource allocation type 1, a UE may be allocated any one of the PRBs in a selected RBG subset. Resource allocation information for the UE may include (i) an indication of the selected RBG subset and (ii) a bitmap for the PRBs in the selected RBG subset. The bitmap may indicate which PRBs are allocated to the UE.

For resource allocation type 2, a UE may be allocated a set of contiguous localized or distributed VRBs. A localized VRB with index $n_{VRB}$ may be mapped directly to a PRB with index $n_{PRB}$, so that $n_{PRB}=n_{VRB}$. A distributed VRB with index $n_{VRB}$ may be mapped to a PRB with index $n_{PRB}$ based on a VRB-to-PRB mapping function f( ), so that $n_{PRB}=f(n_{VRB})$. Resource allocation information for the UE may include (i) an indication of whether localized or distributed VRBs are allocated, (ii) an index of the starting VRB allocated to the UE, and (iii) the number of contiguous VRBs allocated to the UE.

Resource allocation types 0, 1 and 2 are described in 3GPP TS 36.213, entitled "Evolved Universal Terrestrial Radio Access (E-UTRA); Physical layer procedures," which is publicly available.

Downlink grants for resource allocation type 0 and downlink grants for resource allocation type 1 have the same format and may be distinguished from each other via a 1-bit type field. Downlink grants for resource allocation type 2 do not include the type field.

For resource allocation type 0, a bitmap of a suitable size may be used to indicate which RBGs are allocated to a UE. The RBGs may be dependent on the RBG size. The RBG size for the regular UEs may be denoted as P and may be determined based on the DL base bandwidth, e.g., as shown in Table 1. The RBG size for the advanced UEs may be denoted as $P_{ADV}$ and may be determined in various manners.

In a first design, the RBG size for the advanced UEs may be determined based on the DL base bandwidth, so that $P_{ADV}=P$. The number of RBGs for the advanced UEs may be denoted as $N_{RBG,ADV}$ and may be given as $N_{RBG,ADV} = \lceil N_{RB,ADV}^{DL}/P \rceil$, where $N_{RB,ADV}^{DL}$ is the number of PRBs within the DL composite bandwidth. In one design, each RBG may be allocated individually. In this design, the number of bits in the bitmap used to convey a resource allocation of type 0 to an advanced UE may be increased as compared to the number of bits in the bitmap used to convey a resource allocation of type 0 to a regular UE. In another design, some RBGs in the DL base carrier and/or segment(s) may be grouped, so that $N_{RBG}$ bits can be used to convey a resource allocation of type 0 to an advanced UE. For example, some or all RBGs may be allocated in pairs, and each pair of RBGs may be addressable by a bit in the bitmap.

In a second design, the RBG size for the advanced UEs may be determined based on the DL composite bandwidth. $P_{ADV}$ may be used to allocate resources within the DL composite bandwidth to the advanced UEs. If $P_{ADV}/P$ is an integer value, then the RBG size for the advanced UEs may be an integer multiple of the RBG size for the regular UEs. This may simplify resource allocation to the regular UEs and advanced UEs. If $P_{ADV}/P$ is not an integer value, then overlap/collision and/or fragmentation between resources allocated to the regular UEs and resources allocated to the advanced UEs may occur. In one design, $P_{ADV}$ may be rounded up to the nearest value that is an integer multiple of P in order to avoid overlap and/or fragmentation.

In a third design, P may be used to allocate resources within the DL base carrier to the regular UEs and/or advanced UEs, and $P_{ADV}$ may be used to allocate resources within the segment(s) to the advanced UEs. For all designs, a scheduler may allocate resources with appropriate restrictions in order to avoid overlap and/or fragmentation.

In one design, PRBs may be numbered starting with the DL base carrier and extending to the segment(s), e.g., as shown in FIGS. 4A to 4C. For example, the DL base carrier may include 25 PRBs with indices of 0 to 24, an upper segment may include 15 PRBs with indices of 25 to 39, and a lower segment may include 15 PRBs with indices of 40 to 54, as shown in FIG. 4A. P may be used to allocate PRBs within the DL base carrier, and $P_{ADV}$ may be used to allocate PRBs within the two segments. The RBG size for the DL base carrier may be equal to two for 25 PRBs. Thirteen RBGs may be defined for the DL base carrier and may include PRB pairs of (0, 1), (2, 3), ... (22, 23), and (24). The RBG size for the DL composite carrier may be equal to four, which is an integer multiple of the RBG size for the DL base carrier. Eight RBGs may be defined for the two segments and may include PRB sets of (25, 26, 27, 28), ... (49, 50, 51, 52), and (53, 54). The RBGs within the base carrier may be allocated to the regular UEs and/or the advanced UEs. The RBGs within the segments may be allocated to the advanced UEs.

In another design, PRBs may be numbered starting with a segment and extending to the DL base carrier. For example, a lower segment may include 15 PRBs with indices of 0 to 14, the DL base carrier may include 25 PRBs with indices of 15 to 39, and an upper segment may include 15 PRBs with indices of 40 to 54. The RBG size for the segments may be equal to four. Four RBGs may be defined for the lower segment and may include RBGs of (0, 1, 2, 3), ... (12, 13, 14). Another four RBGs may be defined for the upper segment and may include RBGs of (40, 41, 42, 43), ... (52, 53, 54). The RBG size for the base carrier may be equal to two for 25 PRBs. Thirteen RBGs may be defined for the base carrier and may include PRB pairs of (15, 16), (17, 18), ... (37, 38), and (39). This design results in different PRB numbering in the DL base carrier for the regular UEs and advanced UEs.

For resource allocation type 1, a bitmap of $\lceil N_{RB}^{D}/P \rceil$ bits may be used to indicate PRBs allocated to a regular UE from among all PRBs in a selected RBG subset. A bitmap of $\lceil N_{RB,ADV}^{DL}/P \rceil$ bits or $\lceil N_{RB,ADV}^{DL}/P_{ADV} \rceil$ bits may be used to indicate PRBs allocated to an advanced UE from among all PRBs in a selected RBG subset. The numbering of PRBs for the advanced UEs may start with the DL base carrier and extend to the segment(s), so that the numbering of the PRBs within the DL base carrier is the same for both the regular UEs and the advanced UEs, as described above for FIGS. 4A to 4C. If $P_{ADV}=P$, then each RBG subset would include the same set of PRBs within the DL base carrier for the regular UEs and advanced UEs. PRBs within each RBG subset may then be readily allocated to the regular UEs and/or advanced UEs. If $P_{ADV} \neq P$, then the RBG subsets for the regular UEs may be different from the RBG subsets for the advanced UEs. However, since each PRB within each RBG subset can be individually allocated, overlap and/or fragmentation may be avoided. The scheduler may operate with appropriate restrictions if different RBG subsets are available for the regular UEs and advanced UEs. For example, only one regular UE and only one advanced UE may be scheduled in a given slot. P may be equal to 2, and the regular UE may be allocated PRBs within a RBG subset including PRBs 0, 2, 4, 6, 8, 10, 12, etc. $P_{ADV}$ may be equal to 3, and the advanced UE may be allocated PRBs within a RBG subset including PRBs 0, 3, 6, 9, 12, etc. In this example, PRBs 1, 5, 7, 11, etc. would not be included in any of the RBG subsets selected for the regular UE and advanced UE and hence would not be allocated to these UEs. This fragmentation may be avoided by having $P_{ADV}$ be equal to 4 instead of 3.

For resource allocation type 2, a set of contiguous localized or distributed VRBs may be allocated to a UE in a downlink grant sent using DCI format 1A, 1B or 1D. The downlink grant may include a 1-bit flag to indicate whether the allocated VRBs are localized or distributed.

For localized VRB allocation, a UE may be allocated any number of contiguous VRBs of the localized type, from one to the maximum number of VRBs determined by the DL system bandwidth. The allocated VRBs may be mapped directly to PRBs, so that $n_{PRB}=n_{VRB}$. Hence, localized VRBs may be readily allocated to the regular UEs and advanced UEs without overlap and/or fragmentation.

For distributed VRB allocation, a UE may be allocated any number of contiguous VRBs of the distributed type. Resource allocation information for the UE may include an index of a starting VRB and a number of contiguous VRBs. The allocated VRBs may be mapped to non-contiguous PRBs based on a mapping function, which may be dependent on a gap denoted as $N_{gap}$. Table 2 lists gap values for different DL system bandwidths.

TABLE 2

RB Gap Values

| DL System Bandwidth | Gap ($N_{gap}$) | |
|---|---|---|
| ($N_{RB}^{DL}$) | First Gap ($N_{gap1}$) | Second Gap ($N_{gap2}$) |
| 6-10 | $\lfloor N_{RB}^{DL}/2 \rfloor$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

As shown in Table 2, only one gap value $N_{gap1}$ is defined for DL system bandwidth of 6 to 49 RBs, and $N_{gap}=N_{gap1}$. Two gap values $N_{gap1}$ and $N_{gap2}$ are defined for DL system bandwidth of 50 to 110 RBs, and $N_{gap}$ may be equal to either $N_{gap1}$ or $N_{gap2}$, as indicated in a downlink grant. The mapping function that maps VRBs to PRBs is dependent on $N_{gap}$ and is described in the aforementioned 36.211 document.

A gap determined based on the DL base bandwidth may be denoted as $N_{gap}$, and a gap determined based on the DL composite bandwidth may be denoted as $N_{gap,ADV}$. $N_{gap}$ may not be equal to $N_{gap,ADV}$. In this case, various schemes may be used to map distributed VRBs for the regular UEs and distributed VRBs for the advanced UEs.

In a first design, $N_{gap,ADV}$ may be defined such that it is an integer multiple of $N_{gap}$. Distributed VRBs within the DL composite bandwidth may be allocated to the advanced UEs and may be mapped to PRBs within the DL composite bandwidth based on $N_{gap,ADV}$. Distributed VRBs within the DL base bandwidth may be allocated to the regular UEs and may be mapped to PRBs within the DL base bandwidth based on $N_{gap}$.

In a second design, $N_{gap}$ may be used for the distributed VRBs within the DL base carrier, and $N_{gap,ADV}$ may be used for the distributed VRBs within the segment(s). In a third design, the scheduler may operate with appropriate restrictions to avoid overlap and/or fragmentation. For example, the scheduler may allocate some distributed VRBs to the regular UEs, determine the PRBs to which these distributed VRBs are mapped, and avoid allocating distributed VRBs to the advanced UEs that will map to the same PRBs.

For the DL composite bandwidth, the numbering of PRBs may start from the base carrier and extend to the segment(s), as described above. This may prevent offsets in the VRB-to-PRB mapping for the regular UEs and advanced UEs.

For data transmission with HARQ on the uplink, the regular UEs may send data on the PUSCH within the UL base carrier, and the advanced UEs may send data on the PUSCH within the UL composite carrier. An eNB may send ACK information on the PHICH for the data transmission sent by the regular UEs and advanced UEs. In one design, resources used for the PHICH may be within the DL base carrier and may be determined based on the UL composite bandwidth. This design may ensure that PHICH resources are provisioned for addressing the entire UL composite bandwidth. In another design, resources used for the PHICH may be determined based on the UL base bandwidth. This design may ensure backward compatibility.

For data transmission with HARQ on the downlink, an eNB may send downlink grants on the PDCCH to the regular UEs and advanced UEs and may send data on the PDSCH to the scheduled UEs. The scheduled UEs may send ACK information on the PUCCH to the eNB. A downlink grant for a UE may be sent on the PDCCH in one or more control channel elements (CCEs), with each CCE including nine resource elements. The resources to be used by the UE to send ACK information on the PUCCH may be dependent on the first CCE used to send the downlink grant to the UE. In one design, the eNB may send downlink grants on the PDCCH within the DL base carrier. The resources used to send ACK information by the UEs may then be dependent on the DL base carrier. Hence, the advanced UEs may determine resources used to send ACK information in the same manner as the regular UEs.

For data transmission on the uplink, a UE may be allocated a set of contiguous VRBs. Resource allocation information for the UE may be sent in an uplink grant and may include a starting VRB index and a number of VRBs allocated to the UE. The allocated VRBs may be mapped to PRBs for the PUSCH with or without frequency hopping (FH), as indicated by a 1-bit FH field in the uplink grant. In one design, frequency hopping may be applicable to both the UL base carrier and associated segment(s). The UE may perform frequency hopping for the PUSCH based on one of two possible PUSCH hopping types, which are referred to as type 1 PUSCH hopping and type 2 PUSCH hopping and are described in the aforementioned 36.211 and 36.213 documents.

For type 1 PUSCH hopping, the UE may use a set of $L_{CRBs}$ contiguous PRBs starting at a PRB index of $RB_{START}$ for the first slot and starting at a PRB index of $n_{PRB}(i)$ for the second slot. The UE may obtain $L_{CRBs}$ and $RB_{START}$ from the uplink grant. The UE may compute $n_{PRB}(i) = \tilde{n}_{PRB}(i) + \tilde{N}_{RB}^{HO}/2$, where $\tilde{n}_{PRB}(i)$ may be determined as shown in Table 3, and $\tilde{N}_{RB}^{HO}$ may be determined based on a PUSCH hopping parameter $N_{RB}^{HO}$ provided by higher layers. In Table 3, $N_{RB}^{PUSCH}$ is the number of RBs for the PUSCH, and $\tilde{n}_{PRB}^{S1}(i)$ is a parameter determined based on $RB_{START}$ and $\tilde{N}_{RB}^{HO}$.

TABLE 3

PUSCH Hopping Bit Definition

| UL System Bandwidth | Number of Hopping Bits | Information in Hopping Bits | $\tilde{n}_{PRB}(i)$ |
|---|---|---|---|
| 6-49 | 1 | 0 | $(\lfloor N_{RB}^{PUSCH}/2 \rfloor + \tilde{n}_{PRB}^{S1}(i)) \bmod N_{RB}^{PUSCH}$ |
|  |  | 1 | Type 2 PUSCH Hopping |
| 50-110 | 2 | 00 | $(\lfloor N_{RB}^{PUSCH}/4 \rfloor + \tilde{n}_{PRB}^{S1}(i)) \bmod N_{RB}^{PUSCH}$ |
|  |  | 01 | $(-\lfloor N_{RB}^{PUSCH}/4 \rfloor + \tilde{n}_{PRB}^{S1}(i)) \bmod N_{RB}^{PUSCH}$ |
|  |  | 10 | $(\lfloor N_{RB}^{PUSCH}/2 \rfloor + \tilde{n}_{PRB}^{S1}(i)) \bmod N_{RB}^{PUSCH}$ |
|  |  | 11 | Type 2 PUSCH Hopping |

For type 2 PUSCH hopping, the UE may use a set of PRBs determined based on the uplink grant and a predefined hopping pattern described in the aforementioned 36.211 document. The hopping pattern may be dependent on the UL system bandwidth.

In one design, frequency hopping may be performed independently for the UL base carrier and the associated segment(s). This design may avoid collisions between the regular UEs operating on the UL base carrier and the advanced UEs operating on the UL composite carrier. In one design, if there are multiple segments, then the bandwidths of all segments may be considered jointly.

In one design, the number of hopping bits in an uplink grant may be determined based on the UL composite bandwidth. If the UL base bandwidth (or the segment bandwidth) falls into a smaller bandwidth category in Table 3, then frequency hopping for the UL base carrier (or the associated segment(s)) may be determined based on only the last hopping bit. For example, the UL base bandwidth may include 50 RBs, the segment bandwidth may include 25 RBs, and the UL composite bandwidth may include 75 RBs. Two hopping bits may be used for an uplink grant due to the 75 RBs for the UL composite bandwidth and may be set to '10' in the uplink grant. Two hopping bits may be used for the UL base carrier due to the 50 RBs for the UL base bandwidth and may be equal to '10' in the uplink grant. One hopping bit may be used for the segment(s) due to the 25 RBs for the segment bandwidth and may be equal to '0', which is the last bit of the two hopping bits in the uplink grant.

In another design, the number of hopping bits in an uplink grant may be determined based on the UL base bandwidth. If the segment bandwidth falls into a smaller bandwidth category in Table 3, then frequency hopping for the segment(s) may be determined based on a logical AND operation on the hopping bits. In particular, the hopping bit for the segment(s) may be equal to (i) '1' if the hopping bits for the UL base carrier are equal to '11' or (ii) '0' if the hopping bits for the UL base carrier are equal to '00', '01' or '10'. For example, the UL base bandwidth may include 50 RBs, and the segment bandwidth may include 25 RBs. Two hopping bits may be used for an uplink grant due to the 50 RBs for the UL base bandwidth and may be set to '10' in the uplink grant. One hopping bit may be used for the segment(s) due to the 25 RBs for the segment bandwidth and may be equal to '0'.

In one design, some or all parameters defined by higher layers may be unique. A parameter may be considered to be unique if it has the same value for the base carrier with and without segment(s). A UE may use the same value for a unique parameter regardless of whether the UE is operating on only the base carrier or on the base carrier and one or more segments. In one design, the parameter pusch-HoppingOffset $N_{RB}^{HO}$, the parameter Hopping-mode indicative of whether frequency hopping is "inter-subframe" or "intra and inter-subframe," and the number of subbands used to determine the hopping pattern for type 2 PUSCH hopping may be unique. Other parameters may also be defined to be unique.

A UE may measure the channel quality of the downlink and may report CQI information to an eNB. In one design, the UE may send CQI information on resources allocated for the PUCCH within the UL base carrier. The eNB may use the CQI information to schedule the UE for data transmission on the downlink, to select one or more modulation and coding schemes for the UE, etc.

The UE may report wideband CQI for the entire DL system bandwidth or subband CQI for a particular subband on the downlink. The DL system bandwidth may be partitioned into a number of subbands and also into a number of bandwidth parts. The number of subbands and the number of bandwidth parts may be dependent on the DL system bandwidth. Table 4 shows the subband size (in number of RBs) and the number of bandwidth parts for different DL system bandwidths (in number of RBs). The UE may report subband CQI for different subbands in a particular bandwidth part at a given CQI reporting instance. The UE may report subband CQI for subbands in different bandwidth parts at different CQI reporting instances.

TABLE 4

| DL System Bandwidth (RBs) | Subband Size k (RBs) | Bandwidth Parts (J) |
|---|---|---|
| 6-7 | N/A | N/A |
| 8-10 | 4 | 1 |
| 11-26 | 4 | 2 |
| 27-63 | 6 | 3 |
| 64-110 | 8 | 4 |

In a first design, the subband size and the number of bandwidth parts for the advanced UEs in CQI reporting may be determined based on the DL composite bandwidth and may be applicable to the DL base carrier and segment(s), without regards to boundaries between the DL base carrier and segment(s). The subband size and the number of bandwidth parts for the advanced UEs may not match the subband size and the number of bandwidth parts for the regular UEs, which may be determined based on the DL base bandwidth. In this case, the subband CQI from the advanced UEs and the subband CQI from the regular UEs may cover different sets of RBs. A subband CQI for a particular subband for the advanced UEs may cover multiple subbands for the regular UEs and may observe different interference across the subband for the advanced UEs. The advanced UEs may be scheduled in a manner to account for variations in interference observed on the subbands for the advanced UEs.

In a second design of CQI reporting, the advanced UEs may have (i) a first subband size and a first number of bandwidth parts (denoted as $J_{BASE}$) determined based on the DL base bandwidth and (ii) a second subband size and a second number of bandwidth parts (denoted as $J_{SEGMENT}$) determined based on the segment bandwidth of all segments. The segment(s) may also be defined to include only one subband and one bandwidth part. The advanced UEs may then have a total of $J=J_{BASE}+J_{SEGMENT}$ bandwidth parts. The advanced UEs may determine subband CQI based on the first subband size for subbands within the DL base carrier and based on the second subband size for subbands within the segment(s). The advanced UEs may report subband CQI for subbands in different bandwidth parts by cycling through the J bandwidth parts. The advanced UEs may determine wideband CQI for both the DL base carrier and segment(s) and may report the wideband CQI at the same CQI reporting instances as the subband CQI or at different CQI reporting instances.

In a third design of CQI reporting, the advanced UEs may report only wideband CQI for the segment(s). Omitting subband CQI feedback for the segment(s) may result in small or negligible performance degradation if the segment bandwidth is relatively small. The advanced UEs may also report subband CQI and wideband CQI for the DL base carrier, e.g., in similar manner as the regular UEs.

A UE may transmit a sounding reference signal (SRS) on subcarriers assigned to the UE in the last symbol period of certain subframes in which the UE is configured to transmit the SRS. The SRS may be used by an eNB for channel measurement on the uplink, etc. A SRS configuration for the UE may include cell-specific SRS parameters and UE-specific SRS parameters, which are described in the 3GPP TS 36.211. These SRS parameters may indicate the periodicity of SRS transmission by the UE, specific subframes in which to transmit the SRS by the UE, the duration of SRS transmission (e.g., once or indefinitely until disabled), the bandwidth of SRS transmission, frequency hopping bandwidth for SRS transmission, the PRBs to use for SRS transmission, etc.

SRS transmission may be dependent on the UL system bandwidth. In particular, the bandwidth of SRS transmission may be determined by a SRS bandwidth configuration $C_{SRS}$ (which is a cell-specific SRS parameter) and a SRS bandwidth $B_{SRS}$ (which is a UE-specific SRS parameter). Table 5 lists values of two parameters $m_{SRS,b}$ and $N_b$ as a function of the SRS bandwidth configuration $C_{SRS}$ and the SRS bandwidth $B_{SRS}$, where $b=B_{SRS}$. $m_{SRS,b}$ indicates the number of RBs on which to transmit the SRS and determines the frequency span of SRS transmission. $N_b$ is used to determine which subcarriers to use to transmit the SRS and also determines the frequency granularity of SRS transmission.

Various parameters related to SRS transmission are described in the aforementioned 36.211 document. Table 5 is for UL system bandwidth of 6 to 40 RBs. Other tables for other UL system bandwidths are given in 3GPP TS 36.211.

TABLE 5

$m_{SRS,b}$ and $N_b$ Values for UL System Bandwidth $6 \leq N_{RB}^{UL} \leq 40$

| SRS Bandwidth Configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

In a first design of SRS transmission, the advanced UEs may transmit SRS based on the UL composite bandwidth. Parameters for SRS transmission may be determined based on the UL composite bandwidth. Parameters $m_{SRS,b}$ and $N_b$ may be different for the UL base bandwidth and the UL composite bandwidth. Hence, when hopping is enabled, the SRS transmissions from the advanced UEs may collide with the SRS transmissions from the regular UEs. Collision may be avoided by configuring the advanced UEs and regular UEs to transmit SRS at different time instances (e.g., in different subframes).

In a second design of SRS transmission, the advanced UEs may have one SRS configuration for the UL base carrier and another SRS configuration for the segment(s). Parameters for SRS transmission within the UL base carrier may be determined based on the UL base bandwidth. Parameters for SRS transmission within the segment(s) may be determined based on the segment bandwidth. This design may provide more flexibility in configuring SRS transmissions by the advanced UEs. An advanced UE may be configured with the same or different time instances, the same or different periodicities, the same or different frequency spans, and the same or different frequency granularities for SRS transmission on the UL base carrier and segment(s). The advanced UE may transmit SRS on the UL base carrier at certain time instances and on the segment(s) at other time instances in order to maintain a single-carrier waveform for each SRS transmission.

In a third design of SRS transmission, nodes may be defined for the UL base carrier based on the UL base bandwidth, and nodes may also be defined for the segment(s) based on the segment bandwidth or the composite bandwidth. Each node may correspond to a set of subcarriers on which to transmit the SRS at a given time instance. The nodes in the segment(s) may be mapped to the nodes in the UL base carrier based on a predetermined mapping. An advanced UE may send SRS transmissions on different nodes in the UL base carrier at different time instances. Whenever the advanced UE send SRS transmission on a given node in the UL base carrier, the UE also send SRS transmission on the corresponding node in the segment(s). This design may avoid collisions between the SRS transmissions from the advanced UEs and the SRS transmissions from the regular UEs. The advanced UEs may also send SRS transmissions on the UL composite bandwidth in other manners.

Figure 6:
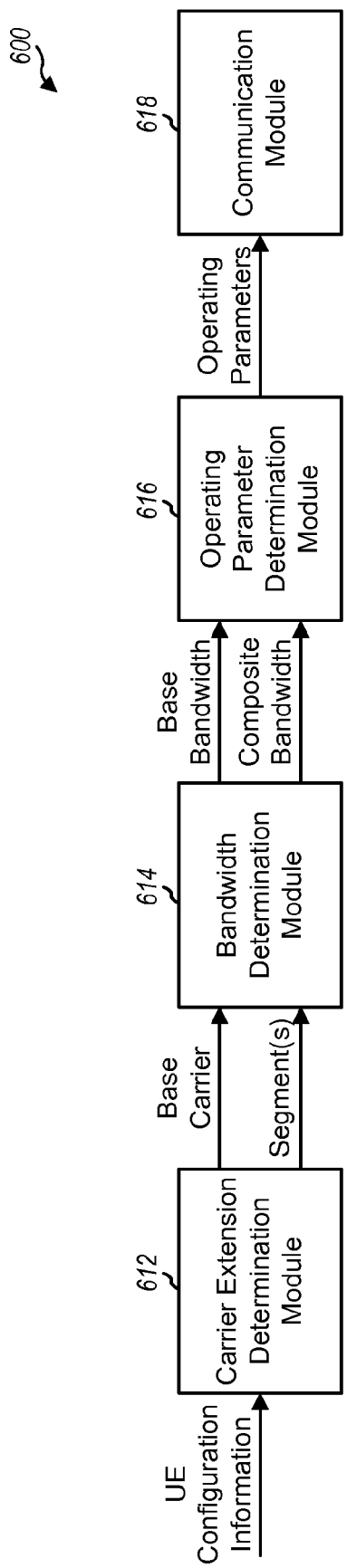
FIG. 6 shows a block diagram of an apparatus for communication.

FIG. 6 shows a block diagram of a design of a communication apparatus 600. Apparatus 600 may be part of a UE or a network entity (e.g., an eNB/base station). Within apparatus 600, a carrier extension determination module 612 may receive configuration information for a UE, determine whether carrier extension is available to the UE for the downlink and/or uplink, and determine a base carrier and one or more segments for each link on which carrier extension is available to the UE. A bandwidth determination module 614 may determine a base bandwidth for the base carrier and a composite bandwidth for the base carrier and segment(s) for each link on which carrier extension is configured for the UE. The bandwidth determination module 614 may also determine a segment bandwidth for the segment(s) on each link.

An operating parameter determination module 616 may receive the base bandwidth and the composite bandwidth for each link and may determine one or more operating parameters for the UE based on the base bandwidth and the composite bandwidth for each link. The one or more parameters may comprise one or more RBG sizes, one or more bitmaps for resource allocation on the downlink, one or more gap values for frequency hopping on the downlink, one or more hopping bits for frequency hopping on the uplink, one or more subbands and/or one or more bandwidth parts for CQI reporting, one or more SRS configurations for SRS transmission, and/or other operating parameters.

A communication module 618 may receive the one or more operating parameters from module 616 and may support communication for the UE based on the operating parameter(s). For example, module 618 may determine resources for data transmission on the downlink and/or uplink based on the operating parameter(s). Module 618 may also determine resources for sending control information or SRS on the downlink and/or uplink based on the operating parameter(s).

Figure 7:
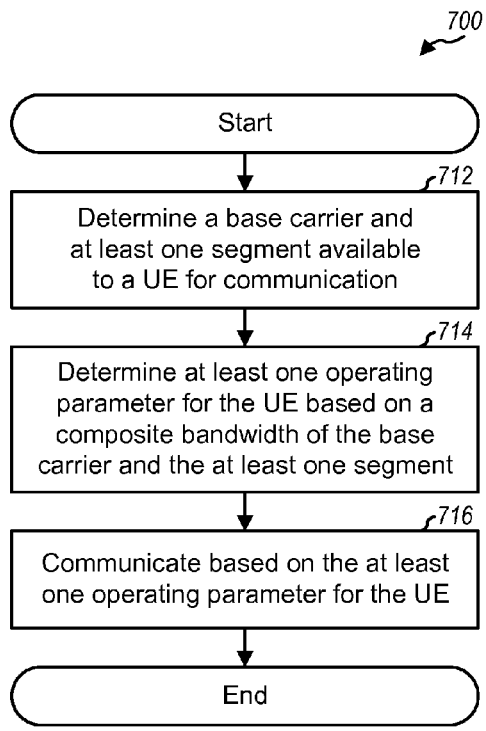
FIG. 7 shows a process for communicating by a UE.

FIG. 7 shows a design of a process 700 for communicating. In one design, process 700 may be performed by a base station/eNB to support communication for a UE. In another design, process 700 may be performed by a UE for communication with a base station. Process 700 may also be performed by some other entity (e.g., network controller 130 in FIG. 1).

A base carrier and at least one segment available to a UE for communication may be determined (block 712). At least one operating parameter for the UE may be determined based on a composite bandwidth for the base carrier and the at least one segment (block 714). Communication may be performed based on the at least one operating parameter for the UE (block 716).

In one design, for carrier extension on the downlink, the base carrier and the at least one segment are for downlink transmission. In another design, for carrier extension on the uplink, the base carrier and the at least one segment are for uplink transmission.

The at least one operating parameter may relate to resource allocation for the UE on the downlink. In one design, a RBG size may be determined based on a base bandwidth of the base carrier. A bitmap may be determined based on the composite bandwidth and the RBG size, and the at least one operating parameter may comprise the bitmap. Resource blocks allocated to the UE may be determined based on the bitmap. In another design, the RBG size may be determined based on the composite bandwidth, and the at least one operating parameter may comprise the RBG size. Resource blocks allocated to the UE may be determined based on the RBG size. In yet another design, a first RBG size may be determined based on the base bandwidth, and a second RBG size may be determined based on the composite bandwidth. The at least one operating parameter may comprise the second RBG size. Resource blocks in the base carrier may be allocated to the UE based on the first RBG size. Resource blocks in the at least one segment may be allocated to the UE based on the second RBG size. The second RBG size may or may not be an integer multiple of the first RBG size.

In one design, a gap may be determined based on the composite bandwidth, and the at least one operating parameter may comprise the gap. A set of VRBs may be allocated to the UE and may be mapped to a set of PRBs based on the gap. In another design, a first gap may be determined based on the base bandwidth, and a second gap may be determined based on the composite bandwidth. The at least one operating parameter may comprise the second gap. VRBs may be mapped to PRBs in the base carrier based on the first gap. VRBs may be mapped to PRBs in the at least one segment based on the second gap. In one design, the second gap may be an integer multiple of the first gap.

In one design, the base carrier and the at least one segment may be for the uplink. Resources for the PHICH for the downlink may be determined based on the UL composite bandwidth. In another design, the base carrier and the at least one segment may be for the downlink. A downlink grant may be received from the PDCCH sent on the DL base carrier. A first CCE used to send the PDCCH may be determined. Resources for sending ACK information on the uplink may be determined based on the first CCE.

The at least one operating parameter may relate to frequency hopping. In one design, frequency hopping may be performed within the base carrier for resources in the base carrier. Frequency hopping may be performed within the at least one segment for resources in the at least one segment.

In one design, a number of hopping bits for signaling at least one frequency hopping mode to the UE may be determined based on the composite bandwidth. The at least one parameter may comprise the number of hopping bits. A first frequency hopping mode for the base carrier may be determined based on at least a first subset of at least one hopping bit. A second frequency hopping mode for the at least one segment may be determined based on at least a second subset of the at least one hopping bit. In another design, the number of hopping bits may be determined based on the base bandwidth. A first frequency hopping mode for the base carrier and a second frequency hopping mode for the at least one segment may be determined based on at least one hopping bit.

The at least one operating parameter may relate to CQI reporting. In one design, a subband size may be determined based on the composite bandwidth, and the at least one operating parameter may comprise the subband size. CQI information may be obtained (e.g., determined by the UE or received by the eNB) for subbands of the subband size. In another design, a first subband size may be determined based on the base bandwidth. A second subband size may be determined based on the composite bandwidth or a segment bandwidth of the at least one segment. The at least one operating parameter may comprise the second subband size. First CQI information may be obtained for subbands of the first subband size within the base carrier. Second CQI information may be obtained for subbands of the second subband size within the at least one segment.

In one design, a first number of bandwidth parts may be determined based on the base bandwidth. A second number of bandwidth parts may be determined based on the segment bandwidth. A third number of bandwidth parts may be determined based on the first and second numbers of bandwidth parts. CQI information may be obtained for the third number of bandwidth parts.

The at least one operating parameter may relate to SRS transmission. In one design, a SRS bandwidth may be determined based on the composite bandwidth. The at least one operating parameter may comprise the SRS bandwidth. SRS may be transmitted or received based on the SRS bandwidth. In another design, a first SRS configuration may be determined for the base carrier, and a second SRS configuration may be determined for the at least one segment. SRS may be transmitted or received on the base carrier based on the first SRS configuration. SRS may be transmitted or received on the at least one segment based on the second SRS configuration.

In one design, resource blocks in the base carrier and the at least one segment may be numbered starting with the resource blocks in the base carrier and extending to the resource blocks in the at least one segment, e.g., as shown in FIGS. 4A to 4C. This design may mitigate overlap and/or fragmentation in resource allocation.

In one design, the base carrier may include a control region and a data region, e.g., as shown in FIG. 2 or 3. The at least one segment may include an extension of the data region and no control region.

In one design, the base carrier and the at least one segment may be considered as a single carrier by the UE. In one design, a single grant may allocate resources in the base carrier, or the at least one segment, or both to the UE. The same HARQ process, the same transmission mode, etc., may be applicable to both the base carrier and the at least one segment.

Figure 8:
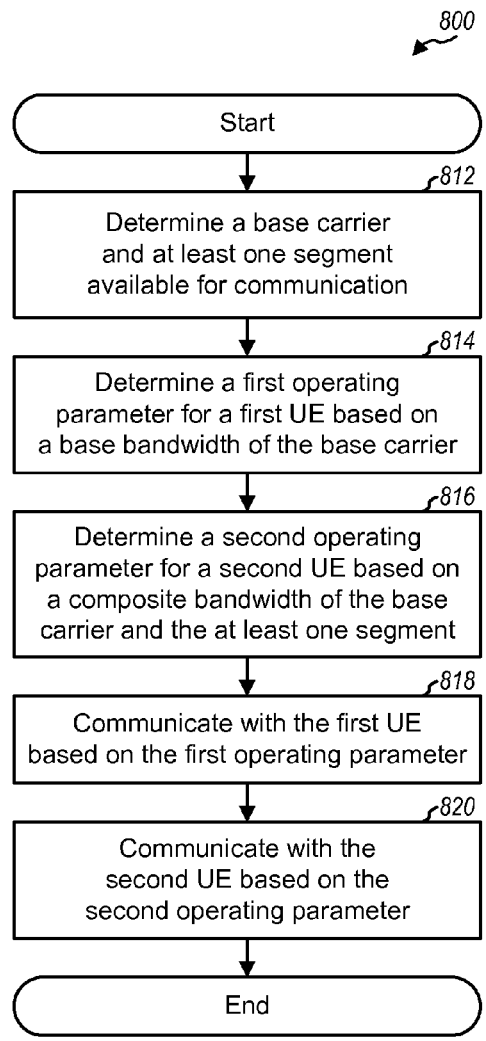
FIG. 8 shows a process for supporting communication by a network entity.

FIG. 8 shows a design of a process 800 for supporting communication by a network entity (e.g., a base station/eNB). A base carrier and at least one segment available for communication may be determined (block 812). A first operating parameter for a first/regular UE may be determined based on a base bandwidth of the base carrier (block 814). A second operating parameter for a second/advanced UE may be determined based on a composite bandwidth of the base carrier and the at least one segment (block 816). Communication with the first UE may be performed based on the first operating parameter (block 818). Communication with the second UE may be performed based on the second operating parameter (block 820).

In one design, a first RBG size may be determined based on the base bandwidth and may correspond to the first operating parameter. A second RBG size may be determined based on the composite bandwidth and may correspond to the second operating parameter. Resource blocks may be allocated by the base station to the first UE based on the first RBG size. Resource blocks may be allocated by the base station to the second UE based on the second RBG size. In another design, a RBG size may be determined based on the base bandwidth. A first bitmap for the first UE may be determined based on the base bandwidth and the RBG size and may correspond to the first operating parameter. A second bitmap for the second UE may be determined based on the composite bandwidth and the RBG size and may correspond to the second operating parameter. Allocated resource blocks may be signaled to the first UE based on the first bitmap. Allocated resource blocks may be signaled to the second UE based on the second bitmap.

In one design, the base station may determine a first gap corresponding to the first operating parameter based on the base bandwidth. A second gap corresponding to the second operating parameter may be determined based on the composite bandwidth. A first set of VRBs may be allocated to the first UE and may be mapped to a first set of PRBs based on the first gap. A second set of VRBs may be allocated to the second UE and may be mapped to a second set of PRBs based on the second gap.

In one design, frequency hopping may be performed within the base carrier for resources in the base carrier. Frequency hopping may be performed within the at least one segment for resources in the at least one segment.

In one design, the base station may determine a first number of hopping bits for signaling a first frequency hopping mode to the first UE based on the base bandwidth. The hopping bits may correspond to the first operating parameter. A second number of hopping bits for signaling a second frequency hopping mode to the second UE may be determined based on the composite bandwidth and may correspond to the second operating parameter. The base station may determine the first frequency hopping mode for the first UE based on the first number hopping bits. The second frequency hopping mode for the second UE may be determined based on the second number of hopping bits.

In one design, the base station may determine a first subband size corresponding to the first operating parameter based on the base bandwidth. A second subband size may be determined based on the composite bandwidth. The second subband size may correspond to the second operating parameter. First CQI information determined by the first UE based on the first subband size may be received at the base station. Second CQI information determined by the second UE based on the second subband size may also be received.

In one design, the base station may determine a first number of bandwidth parts based on the base bandwidth. A second number of bandwidth parts may be determined based on the segment bandwidth or the composite bandwidth. A third number of bandwidth parts may be determined based on the first and second numbers of bandwidth parts. CQI information may be received from the second UE for the third number of bandwidth parts.

In one design, the base station may determine a first SRS bandwidth correspond to the first operating parameter based on the base bandwidth. A second SRS bandwidth may be determined based on the composite bandwidth and may correspond to the second operating parameter. A first SRS transmission on the first SRS bandwidth may be received from the first UE. A second SRS transmission on the second SRS bandwidth may be received from the second UE.

In one design, the base station may determine a first SRS configuration for the base carrier. A second SRS configuration may be determined for the at least one segment. A first SRS transmission may be sent by the second UE on the base carrier based on the first SRS configuration. A second SRS transmission may be sent by the second UE on the at least one segment based on the second SRS configuration.

Exemplary designs of the first and second operating parameters have been described above. The first and second operating parameters may also relate to other features of communication and may be determined in other manners, as described above.

Figure 9:
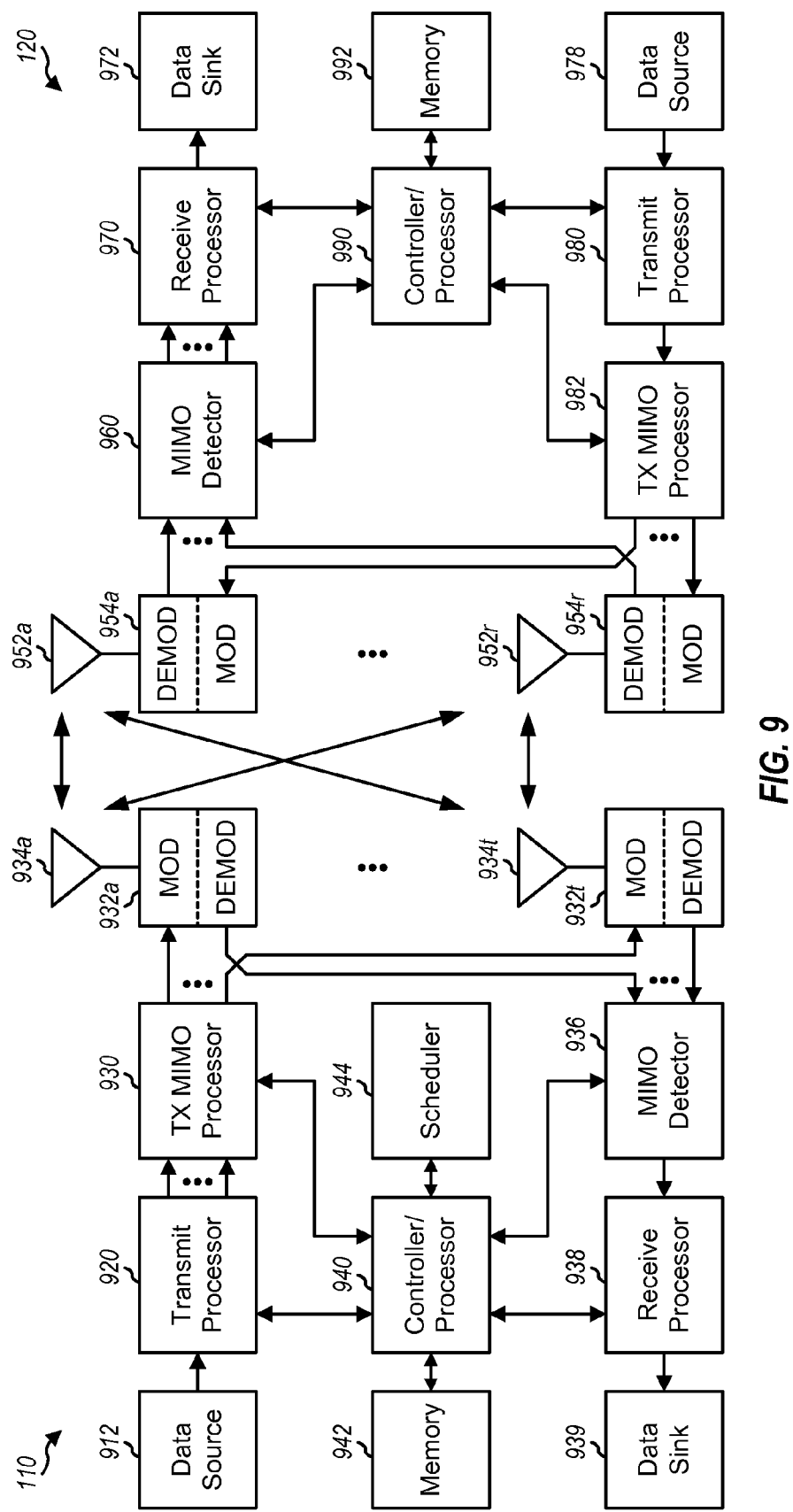
FIG. 9 shows a block diagram of a base station and a UE.

FIG. 9 shows a block diagram of a design of a base station/eNB 110 and a UE 120, which may be one of the base stations/eNBs and one of the UEs in FIG. 1. Base station 110 may be equipped with T antennas 934a through 934t, and UE 120 may be equipped with R antennas 952a through 952r, where in general T≥1 and R≥1.

At base station 110, a transmit processor 920 may receive data from a data source 912 for one or more UEs, process (e.g., encode and modulate) the data for each UE based on one or more modulation and coding schemes selected for that UE, and provide data symbols for all UEs. Transmit processor 920 may also process control information (e.g., grants, configuration information, etc.) and provide control symbols. Transmit processor 920 may also generate reference symbols for synchronization signals and reference signals. A transmit (TX) multiple-input multiple-output (MIMO) processor 930 may precode the data symbols, the control symbols, and/or the reference symbols (if applicable) and may provide T output symbol streams to T modulators (MOD) 932a through 932t. Each modulator 932 may process its output symbol stream (e.g., for OFDM, etc.) to obtain an output sample stream. Each modulator 932 may further condition (e.g., convert to analog, filter, amplify, and upconvert) its output sample stream and generate a downlink signal. T downlink signals from modulators 932a through 932t may be transmitted via T antennas 934a through 934t, respectively.

At UE 120, R antennas 952a through 952r may receive the T downlink signals from base station 110, and each antenna 952 may provide a received signal to an associated demodulator (DEMOD) 954. Each demodulator 954 may condition (e.g., filter, amplify, downconvert, and digitize) its received signal to obtain samples and may further process the samples (e.g., for OFDM, etc.) to obtain received symbols. A MIMO detector 960 may obtain received symbols from all demodulators 954, perform MIMO detection on the received symbols if applicable, and provide detected symbols. A receive processor 970 may process (e.g., demodulate and decode) the detected symbols, provide decoded data for UE 120 to a data sink 972, and provide decoded control information to a controller/processor 990.

On the uplink, at UE 120, data from a data source 978, control information (e.g., ACK information, CQI information, etc.) from controller/processor 990, and reference signals may be processed by a transmit processor 980, precoded by a TX MIMO processor 982 if applicable, further processed by modulators 954a through 954r, and transmitted to base station 110. At base station 110, the uplink signals from UE 120 may be received by antennas 934, processed by demodulators 932, detected by a MIMO detector 936 if applicable, and further processed by a receive processor 938 to recover the data and control information sent by UE 120. Processor 938 may provide the recovered data to a data sink 939 and may provide the recovered control information to controller/processor 940.

Controllers/processors 940 and 990 may direct the operation at base station 110 and UE 120, respectively. Processor 940 and/or other processors and modules at base station 110 may perform or direct process 700 in FIG. 7, process 800 in FIG. 8, and/or other processes for the techniques described herein. Processor 990 and/or other processors and modules at UE 120 may perform or direct process 700 in FIG. 7 and/or other processes for the techniques described herein. Memories 942 and 992 may store data and program codes for base station 110 and UE 120, respectively. A scheduler 944 may schedule UE 120 and/or other UEs for data transmission on the downlink and/or uplink. Processor 940, scheduler 944 and/or other processors and modules at base station 110 may implement module 600 in FIG. 6. Processors 990 and/or other processors and modules at UE 120 may also implement module 600 in FIG. 6.

In one configuration, base station 110 and/or UE 120 may include means for determining a base carrier and at least one segment available to the UE 120 for communication, means for determining at least one operating parameter for the UE 120 based on a composite bandwidth of the base carrier and the at least one segment, and means for communicating based on the at least one operating parameter for the UE 120.

In one configuration, base station 110 may include means for determining a base carrier and at least one segment available for communication, means for determining a first operating parameter for a first UE based on a base bandwidth of the base carrier, means for determining a second operating parameter for a second UE based on a composite bandwidth of the base carrier and the at least one segment, means for communicating with the first UE based on the first operating parameter, and means for communicating with the second UE based on the second operating parameter.

In an aspect, the aforementioned means may be processor(s) 920, 938 and/or 940 at base station 110 and/or processors(s) 970, 980 and/or 990 at UE 120, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    determining a base carrier covering a first range of frequencies and having contiguously numbered resource blocks and at least one segment covering a second range of frequencies different from the first range of frequencies and having contiguously numbered resource blocks continuing in number from a number of a last resource block of the base carrier, the base carrier and the at least one segment available to a user equipment (UE) for communication, wherein resource blocks in the base carrier and the at least one segment are numbered starting with resource blocks in the base carrier and extending to resource blocks in the at least one segment;
    determining at least one operating parameter for the UE based on a composite frequency bandwidth of the base carrier and the at least one segment; and
    communicating based on the at least one operating parameter for the UE.

2. The method of claim 1, further comprising:
    determining a resource block group (RBG) size based on a bandwidth of the base carrier;
    determining a bitmap based on the composite frequency bandwidth and the RBG size, wherein the at least one operating parameter comprises the bitmap; and
    determining resource blocks allocated to the UE based on the bitmap.

3. The method of claim 1, further comprising:
    determining a resource block group (RBG) size based on the composite frequency bandwidth, wherein the at least one operating parameter comprises the RBG size; and
    determining resource blocks allocated to the UE based on the RBG size.

4. The method of claim 1, further comprising:
    determining a first resource block group (RBG) size based on a bandwidth of the base carrier;
    determining a second RBG size based on the composite frequency bandwidth, wherein the at least one operating parameter comprises the second RBG size;
    determining resource blocks in the base carrier allocated to the UE based on the first RBG size; and
    determining resource blocks in the at least one segment available to the UE based on the second RBG size.

5. The method of claim 4, wherein the second RBG size is an integer multiple of the first RBG size.

6. The method of claim 1, further comprising:
    determining a gap based on the composite frequency bandwidth, wherein the at least one operating parameter comprises the gap;
    determining a set of virtual resource blocks (VRBs) allocated to the UE; and
    mapping the set of VRBs to a set of physical resource blocks (PRBs) based on the gap.

7. The method of claim 1, further comprising:
    determining a first gap based on a bandwidth of the base carrier;
    determining a second gap based on the composite frequency bandwidth, wherein the at least one operating parameter comprises the second gap;
    mapping virtual resource blocks (VRBs) to physical resource blocks (PRBs) in the base carrier based on the first gap; and
    mapping VRBs to PRBs in the at least one segment based on the second gap.

8. The method of claim 1, further comprising:
    determining a first gap based on a bandwidth of the base carrier;
    determining a second gap based on the composite frequency bandwidth, wherein the second gap is an integer multiple of the first gap, and wherein the at least one operating parameter comprises the second gap; and
    mapping virtual resource blocks (VRBs) to physical resource blocks (PRBs) based on the second gap.

9. The method of claim 1, wherein the base carrier and the at least one segment are for an uplink, the method further comprising:
determining resources for a Physical HARQ Indicator Channel (PHICH) for a downlink based on the composite frequency bandwidth for the uplink.

10. The method of claim 1, wherein the base carrier and the at least one segment are for a downlink, the method further comprising:
receiving a downlink grant from a Physical Downlink Control Channel (PDCCH) sent on the base carrier;
determining a first control channel element (CCE) used to send the PDCCH; and
determining resources for sending acknowledgement (ACK) information on uplink based on the first CCE.

11. The method of claim 1, further comprising:
performing frequency hopping within the base carrier for resources in the base carrier; and
performing frequency hopping within the at least one segment for resources in the at least one segment.

12. The method of claim 1, further comprising:
determining a number of hopping bits for signaling at least one frequency hopping mode to the UE based on the composite frequency bandwidth, wherein the at least one parameter comprises the number of hopping bits.

13. The method of claim 12, further comprising:
determining a first frequency hopping mode for the base carrier based on at least a first subset of the hopping bits; and
determining a second frequency hopping mode for the at least one segment based on at least a second subset of the hopping bits.

14. The method of claim 1, further comprising:
receiving at least one hopping bit signaling frequency hopping modes to the UE, wherein a number of hopping bits is determined based on a bandwidth of the base carrier;
determining a first frequency hopping mode for the base carrier based on the at least one hopping bit; and
determining a second frequency hopping mode for the at least one segment based on the at least one hopping bit.

15. The method of claim 1, further comprising:
determining a subband size based on the composite frequency bandwidth, wherein the at least one operating parameter comprises the subband size; and
obtaining channel quality indicator (CQI) information for subbands of the subband size.

16. The method of claim 1, further comprising:
determining a first subband size based on a bandwidth of the base carrier;
determining a second subband size based on the composite frequency bandwidth or a bandwidth of the at least one segment, wherein the at least one operating parameter comprises the second subband size;
obtaining first channel quality indicator (CQI) information for subbands of the first subband size within the base carrier; and
obtaining second CQI information for subbands of the second subband size within the at least one segment.

17. The method of claim 1, further comprising:
determining a first number of bandwidth parts based on a bandwidth of the base carrier;
determining a second number of bandwidth parts based on a bandwidth of the at least one segment;
determining a third number of bandwidth parts based on the first and second numbers of bandwidth parts; and
obtaining channel quality indicator (CQI) information for the third number of bandwidth parts.

18. The method of claim 1, further comprising:
determining a sounding reference signal (SRS) bandwidth based on the composite frequency bandwidth, wherein the at least one operating parameter comprises the SRS bandwidth; and
transmitting or receiving SRS based on the SRS bandwidth.

19. The method of claim 1, further comprising:
determining a first sounding reference signal (SRS) configuration for the base carrier;
determining a second SRS configuration for the at least one segment;
transmitting or receiving SRS on the base carrier based on the first SRS configuration; and
transmitting or receiving SRS on the at least one segment based on the second SRS configuration.

20. The method of claim 1, wherein the base carrier includes a control region and a data region, and wherein the at least one segment comprises an extension of the data region.

21. The method of claim 1, further comprising:
receiving a single grant allocating resources in the base carrier, or the at least one segment, or both at the UE.

22. The method of claim 1, wherein the determining the base carrier and the at least one segment, the determining the at least one operating parameter, and the communicating are performed by a base station for communication with the UE.

23. The method of claim 1, wherein the determining the base carrier and the at least one segment, the determining the at least one operating parameter, and the communicating are performed by the UE for communication with a base station.

24. The method of claim 1, wherein the base carrier and the at least one segment are for downlink transmission.

25. The method of claim 1, wherein the base carrier and the at least one segment are for uplink transmission.

26. An apparatus for wireless communication, comprising:
means for determining a base carrier covering a first range of frequencies and having contiguously numbered resource blocks and at least one segment covering a second range of frequencies different from the first range of frequencies and having contiguously numbered resource blocks continuing in number from a number of a last resource block of the base carrier, the base carrier and the at least one segment available to a user equipment (UE) for communication, wherein resource blocks in the base carrier and the at least one segment are numbered starting with resource blocks in the base carrier and extending to resource blocks in the at least one segment;
means for determining at least one operating parameter for the UE based on a composite frequency bandwidth of the base carrier and the at least one segment; and
means for communicating based on the at least one operating parameter for the UE.

27. The apparatus of claim 26, further comprising:
means for determining a resource block group (RBG) size based on a bandwidth of the base carrier;
means for determining a bitmap based on the composite frequency bandwidth and the RBG size, wherein the at least one operating parameter comprises the bitmap; and
means for determining resource blocks allocated to the UE based on the bitmap.

28. The apparatus of claim 26, further comprising:
means for determining a gap based on the composite frequency bandwidth, wherein the at least one operating parameter comprises the gap;
means for determining a set of virtual resource blocks (VRBs) allocated to the UE; and means for mapping the set of VRBs to a set of physical resource blocks (PRBs) based on the gap.

29. The apparatus of claim 26, wherein the base carrier and the at least one segment are for an uplink, the apparatus further comprising:
means for determining resources for a Physical HARQ Indicator Channel (PHICH) for downlink based on the composite frequency bandwidth for the uplink.

30. The apparatus of claim 26, further comprising:
means for performing frequency hopping within the base carrier for resources in the base carrier; and
means for performing frequency hopping within the at least one segment for resources in the at least one segment.

31. The apparatus of claim 26, further comprising:
means for determining a subband size based on the composite frequency bandwidth, wherein the at least one operating parameter comprises the subband size; and
means for obtaining channel quality indicator (CQI) information for subbands of the subband size.

32. The apparatus of claim 26, further comprising:
means for determining a sounding reference signal (SRS) bandwidth based on the composite frequency bandwidth, wherein the at least one operating parameter comprises the SRS bandwidth; and
means for transmitting or receiving SRS based on the SRS bandwidth.

33. An apparatus for wireless communication, comprising:
at least one processor configured to:
determine a base carrier covering a first range of frequencies and having contiguously numbered resource blocks and at least one segment covering a second range of frequencies different from the first range of frequencies and having contiguously numbered resource blocks continuing in number from a number of a last resource block of the base carrier, the base carrier and the at least one segment available to a user equipment (UE) for communication, wherein resource blocks in the base carrier and the at least one segment are numbered starting with resource blocks in the base carrier and extending to resource blocks in the at least one segment,
determine at least one operating parameter for the UE based on a composite frequency bandwidth of the base carrier and the at least one segment, and
communicate based on the at least one operating parameter for the UE; and
a memory coupled to the at least one processor.

34. The apparatus of claim 33, wherein the at least one processor is configured to:
determine a resource block group (RBG) size based on a bandwidth of the base carrier,
determine a bitmap based on the composite frequency bandwidth and the RBG size, wherein the at least one operating parameter comprises the bitmap, and
determine resource blocks allocated to the UE based on the bitmap.

35. The apparatus of claim 33, wherein the at least one processor is configured to:
determine a gap based on the composite frequency bandwidth, wherein the at least one operating parameter comprises the gap,
determine a set of virtual resource blocks (VRBs) allocated to the UE, and map the set of VRBs to a set of physical resource blocks (PRBs) based on the gap.

36. The apparatus of claim 33, wherein the base carrier and the at least one segment are for an uplink, and wherein the at least one processor is configured to determine resources for a Physical HARQ Indicator Channel (PHICH) for downlink based on the composite frequency bandwidth for the uplink.

37. The apparatus of claim 33, wherein the at least one processor is configured to:
perform frequency hopping within the base carrier for resources in the base carrier, and
perform frequency hopping within the at least one segment for resources in the at least one segment.

38. The apparatus of claim 33, wherein the at least one processor is configured to:
determine a subband size based on the composite frequency bandwidth, wherein the at least one operating parameter comprises the subband size, and
obtain channel quality indicator (CQI) information for subbands of the subband size.

39. The apparatus of claim 33, wherein the at least one processor is configured to:
determine a sounding reference signal (SRS) bandwidth based on the composite frequency bandwidth, wherein the at least one operating parameter comprises the SRS bandwidth, and
transmit or receiving SRS based on the SRS bandwidth.

40. A computer program product, comprising:
a non-transitory computer-readable medium comprising:
code for causing at least one computer to determine a base carrier covering a first range of frequencies and having contiguously numbered resource blocks and at least one segment covering a second range of frequencies different from the first range of frequencies and having contiguously numbered resource blocks continuing in number from a number of a last resource block of the base carrier, the base carrier and the at least one segment available to a user equipment (UE) for communication, wherein resource blocks in the base carrier and the at least one segment are numbered starting with resource blocks in the base carrier and extending to resource blocks in the at least one segment,
code for causing the at least one computer to determine at least one operating parameter for the UE based on a composite frequency bandwidth of the base carrier and the at least one segment, and
code for causing the at least one computer to communicate based on the at least one operating parameter for the UE.

41. A method for wireless communication, comprising:
determining a base carrier covering a first range of frequencies and having contiguously numbered resource blocks and at least one segment covering a second range of frequencies different from the first range of frequencies and having contiguously numbered resource blocks continuing in number from a number of a last resource block of the base carrier, the base carrier and the at least one segment available for communication, wherein resource blocks in the base carrier and the at least one segment are numbered starting with resource blocks in the base carrier and extending to resource blocks in the at least one segment;
determining a first operating parameter for a first user equipment (UE) based on a base bandwidth of the base carrier;
determining a second operating parameter for a second UE based on a composite frequency bandwidth of the base carrier and the at least one segment;
communicating with the first UE based on the first operating parameter; and communicating with the second UE based on the second operating parameter.

42. The method of claim 41, further comprising:
determining a first resource block group (RBG) size based on the base bandwidth, wherein the first operating parameter comprises the first RBG size;
determining a second RBG size based on the composite frequency bandwidth, wherein the second operating parameter comprises the second RBG size;
allocating resource blocks to the first UE based on the first RBG size; and
allocating resource blocks to the second UE based on the second RBG size.

43. The method of claim 41, further comprising:
determining a resource block group (RBG) size based on the base bandwidth;
determining a first bitmap for the first UE based on the base bandwidth and the RBG size, wherein the first operating parameter comprises the first bitmap;
determining a second bitmap for the second UE based on the composite frequency bandwidth and the RBG size, wherein the second operating parameter comprises the second bitmap;
signaling resource blocks allocated to the first UE based on the first bitmap; and
signaling resource blocks allocated to the second UE based on the second bitmap.

44. The method of claim 41, further comprising:
determining a first gap based on the base bandwidth, wherein the first operating parameter comprises the first gap;
determining a second gap based on the composite frequency bandwidth, wherein the second operating parameter comprises the second gap;
allocating a first set of virtual resource blocks (VRBs) to the first UE;
allocating a second set of VRBs to the second UE;
mapping the first set of VRBs to a first set of physical resource blocks (PRBs) based on the first gap; and
mapping the second set of VRBs to a second set of PRBs based on the second gap.

45. The method of claim 41, further comprising:
performing frequency hopping within the base carrier for resources in the base carrier; and
performing frequency hopping within the at least one segment for resources in the at least one segment.

46. The method of claim 41, further comprising:
determining a first number of hopping bits for signaling a first frequency hopping mode to the first UE based on the base bandwidth, wherein the first operating parameter comprises the first number of hopping bits;
determining a second number of hopping bits for signaling a second frequency hopping mode to the second UE based on the composite frequency bandwidth, wherein the second operating parameter comprises the second number of hopping bits;
determining the first frequency hopping mode for the first UE based on the first number hopping bits; and
determining the second frequency hopping mode for the second UE based on the second number of hopping bits.

47. The method of claim 41, further comprising:
determining a first subband size based on the base bandwidth, wherein the first operating parameter comprises the first subband size;
determining a second subband size based on the composite frequency bandwidth or a bandwidth of the at least one segment, wherein the second operating parameter comprises the second subband size;
receiving first channel quality indicator (CQI) information determined by the first UE based on the first subband size; and
receiving second CQI information determined by the second UE based on the second subband size.

48. The method of claim 41, further comprising:
determining a first number of bandwidth parts based on the base bandwidth;
determining a second number of bandwidth parts based on a bandwidth of the at least one segment;
determining a third number of bandwidth parts based on the first and second numbers of bandwidth parts; and
receiving channel quality indicator (CQI) information from the second UE for the third number of bandwidth parts.

49. The method of claim 41, further comprising:
determining a first sounding reference signal (SRS) bandwidth based on the base bandwidth, wherein the first operating parameter comprises the first SRS bandwidth;
determining a second SRS bandwidth based on the composite frequency bandwidth, wherein the second operating parameter comprises the second SRS bandwidth;
receiving a first SRS transmission sent by the first UE based on the first SRS bandwidth; and
receiving a second SRS transmission sent by the second UE based on the second SRS bandwidth.

50. The method of claim 41, further comprising:
determining a first sounding reference signal (SRS) configuration for the base carrier;
determining a second SRS configuration for the at least one segment;
receiving a first SRS transmission sent by the second UE on the base carrier based on the first SRS configuration; and
receiving a second SRS transmission sent by the second UE on the at least one segment based on the second SRS configuration.

* * * * *